(12) United States Patent
Kadota et al.

(10) Patent No.: US 8,349,994 B2
(45) Date of Patent: Jan. 8, 2013

(54) ELECTRODE ELECTROLYTE FOR POLYMER-TYPE FUEL CELL, AND USE THEREOF

(75) Inventors: Toshiaki Kadota, Tokyo (JP); Yoshitaka Yamakawa, Tokyo (JP); Fusao Nakagawa, Wako (JP); Nagayuki Kanaoka, Wako (JP); Takaki Nakagawa, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 321 days.

(21) Appl. No.: 12/600,801

(22) PCT Filed: May 16, 2008

(86) PCT No.: PCT/JP2008/059068
§ 371 (c)(1),
(2), (4) Date: Nov. 18, 2009

(87) PCT Pub. No.: WO2008/143184
PCT Pub. Date: Nov. 27, 2008

(65) Prior Publication Data
US 2010/0167161 A1    Jul. 1, 2010

(30) Foreign Application Priority Data
May 18, 2007 (JP) .................. 2007-133086

(51) Int. Cl.
*C08G 75/00* (2006.01)
(52) U.S. Cl. ..... 528/373; 528/125; 528/128; 548/343.5; 548/170; 429/483; 429/479
(58) Field of Classification Search ............... 528/125, 528/128, 373; 548/343.5, 170
See application file for complete search history.

(56) References Cited

U.S. PATENT DOCUMENTS

| | | | |
|---|---|---|---|
| 6,555,626 B2 | 4/2003 | Goto et al. | |
| 6,812,290 B2 | 11/2004 | Goto et al. | |
| 7,163,988 B2 | 1/2007 | Rozhanskii et al. | |
| 7,396,607 B2 | 7/2008 | Masaka et al. | |
| 2005/0026029 A1 | 2/2005 | Kawai et al. | |
| 2009/0134360 A1 | 5/2009 | Komatsu et al. | |

FOREIGN PATENT DOCUMENTS

| | | | |
|---|---|---|---|
| JP | 2001-342241 A | | 12/2001 |
| JP | 2004-137444 A | | 5/2004 |
| JP | 2004-253267 A | | 9/2004 |
| JP | 2005-50726 A | | 2/2005 |
| JP | 2005-060625 A | | 3/2005 |
| JP | 2005-226047 A | | 8/2005 |
| JP | 2006-96989 A | | 4/2006 |
| JP | 2006-179256 A | | 7/2006 |
| JP | 2006-335816 A | | 12/2006 |
| JP | 2007-22959 A | | 2/2007 |
| JP | 2007-026888 | * | 2/2007 |
| JP | 2007-026888 A | | 2/2007 |
| JP | 2007022959 | * | 2/2007 |
| WO | WO 2007/010730 A1 | | 1/2007 |
| WO | WO 2007/052605 A1 | | 5/2007 |

OTHER PUBLICATIONS

Database WPI, Week 200726, Thomson Scientific, London, GB, AN 2007-261603, XP002665893.
U.S. Appl. No. 12/474,828, filed May 29, 2009, Takaki Nakagawa.
Final Office Action mailed Mar. 6, 2010 in U.S. Appl. No. 12/474,828, 14 pages.

* cited by examiner

*Primary Examiner* — Shane Fang
(74) *Attorney, Agent, or Firm* — Arent Fox LLP

(57) ABSTRACT

Disclosed is an electrode electrolyte for solid polymer fuel cells, which uses a polymer electrolyte containing a polyarylene copolymer containing a nitrogen-containing aromatic ring having a substituent represented by —$SO_3H$, —$O(CH_2)_nSO_3H$ or —$O(CF_2)_nSO_3H$ (wherein h represents an integer of 1-12). By having such a constitution, the electrode electrolyte for solid polymer fuel cells can be produced at a low cost, while being excellent in proton conductivity, dimensional stability, hydrothermal resistance and mechanical strength. In addition, this electrode electrolyte for solid polymer fuel cells enables to recover a catalyst metal.

2 Claims, No Drawings

ELECTRODE ELECTROLYTE FOR POLYMER-TYPE FUEL CELL, AND USE THEREOF

CROSS-REFERENCE TO RELATED APPLICATION

This application is a National Stage entry of International Application No. PCT/JP2008/059068, filed May 16, 2008, which claims priority to Japanese Patent Application No. 2007-133086, filed May 18, 2007, the disclosure of the prior application is incorporated in its entirety by reference.

TECHNICAL FIELD

The present invention relates to an electrode electrolyte, for a solid polymer-type fuel cell, containing a polymer including a specific structural unit, an electrode paste, an electrode, and a membrane-electrode junction.

BACKGROUND ART

A solid polymer-type fuel cell has an ability of generating a high output density and can be operated at low temperature and, therefore, can be reduced in size and weight. Accordingly, the solid polymer-type fuel cell is expected to be put into practical use as, for example, a power source of an automobile, a power source for stationary electric power generation, or a power source for electric power generation of a mobile device.

In a solid polymer-type fuel cell, a pair of electrodes are disposed on both sides of a solid polymer electrolyte membrane having proton conductivity, and electric power is generated by supplying pure hydrogen or reformed hydrogen serving as a fuel gas to one electrode (fuel electrode) and supplying an oxygen gas or air serving as an oxidant to the other electrode (air electrode).

The electrodes of such a fuel cell are constituted of an electrode electrolyte in which a catalyst component is dispersed (hence the electrodes may be called electrode catalyst layers in some cases). The electrode catalyst layer on the fuel electrode side generates protons and electrons from the fuel gas; the electrode catalyst layer on the air electrode side generates water from oxygen, protons, and electrons; and the solid polymer electrolyte membrane ionically conducts protons. Thus, electric power is obtained through the electrode catalyst layers.

Conventionally, in the solid polymer-type fuel cell, a perfluoroalkylsulfonic acid-based polymer represented by Nafion (trademark) has been used as the electrolyte of the electrode catalyst layers. This material is excellent in proton conductivity, but is very expensive. In addition, the material has a large number of fluorine atoms in the molecule thereof and is thereby low in combustibility, which causes a problem to make the recovery and the reuse of expensive noble metal, such as platinum, used in the electrode catalyst very difficult.

On the other hand, various non-perfluoroalkylsulfonic acid-based polymers have been investigated as alternative materials. In aiming to be used at a high temperature condition where the power generation efficiency is high, it has been attempted to use aromatic sulfonic acid-based polymers having high heat resistance as electrolytes.

For example, Japanese Unexamined Patent Application Publication No. 2005-50726 (Patent Document 1) discloses the use of a sulfonated polyarylene polymer as the electrode electrolyte. Furthermore, Japanese Unexamined Patent Application Publication No. 2004-253267 (Patent Document 2) discloses the use of specific sulfonated polyarylene.

[Patent Document 1] Japanese Unexamined Patent Application Publication No. 2005-50726

[Patent Document 2] Japanese Unexamined Patent Application Publication No. 2004-253267

DISCLOSURE OF INVENTION

Problems to be Solved by the Invention

However, in these materials conventionally known as electrolytes, a reversible elimination reaction of a sulfonic acid group or a cross-linking reaction involving sulfonic acid may occur at high temperature. This causes, for example, a reduction in proton conductivity or embrittlement of a membrane, which are problems leading to a reduction in power generation output of the fuel cell or a failure of power generation due to rupture of the membrane.

In addition, in order to avoid these problems as much as possible, at present, the upper limit of temperature during the power generation by a fuel cell is regulated, resulting in limitation of the power generation output.

An increase in the sulfonic acid concentration for increasing the proton conductivity causes occurrence of a high degree of swelling due to absorption of water under high-temperature and high-humidity conditions, which blocks the gas passage to cause a problem to reduce the power generation performance.

Furthermore, conventionally used electrolyte membranes represented by Nafion readily swell in a methanol aqueous solution and therefore do not have sufficient methanol resistance. Consequently, such electrolyte membranes are still insufficient for being applied to direct methanol-type fuel cells.

That is, it is an object of the present invention to solve the problems in price and relating to recovery of catalyst metals, described above, and to provide an electrode electrolyte, for a solid polymer-type fuel cell, excellent in proton conductivity, size stability, hot water resistance, and mechanical properties and further provide an electrode paste, an electrode, and a catalyst-containing electrolyte membrane each containing the electrolyte.

Means for Solving the Problems

The present invention has been accomplished for solving the above-mentioned problems. That is, it has been found that the use of a polymer giving a membrane that maintains high electric properties even if the number of introduced sulfonic acid groups is increased and shows an excellent swelling-inhibiting effect even under high-temperature and high-humidification conditions and excellent electric properties even under high-temperature and low-humidification conditions allows material design having high proton conductivity, an increase in stability of the sulfonic acid groups under high temperature conditions, synthesis of a copolymer having high proton conductivity even if the composition ratio of a unit not having sulfonic acid group in the copolymer is increased, and material design being excellent in hot water resistance and mechanical properties, and thereby the above-mentioned problems are solved.

Furthermore, it has been found that fluorine atoms are not contained or contained in a significantly reduced amount, even if contained, in the polymer, which makes it possible to solve the problems of recovering and reusing catalyst metal, described above, resulting in accomplishment of the present invention.

The constitution of the present invention is as follows:

[1] An electrode electrolyte, for a polymer-type fuel cell, comprising a polyarylene-based copolymer including a sulfonic acid group, wherein the copolymer contains a repeating constitutional unit represented by the following Formula (I):

[Formula 1]

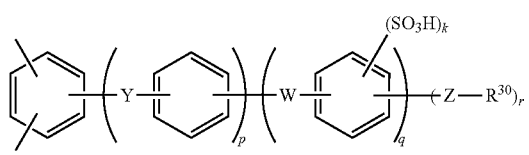

(in Formula (I), Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$—; W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—; Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$—; R$^{30}$ denotes a nitrogen-containing aromatic ring having a substituent represented by —SO$_3$H, —O(CH$_2$)$_h$SO$_3$H, or —O(CF$_2$)$_h$SO$_3$H (h is an integer of 1 to 12);

denotes an integer of 0 to 10; q denotes an integer of 0 to 10; r denotes an integer of 1 to 5; and k denotes an integer of 0 to 4, and in single lines at the ends of each constitutional unit, a single line not showing a substituent on one side thereof means coupling with the adjacent constitutional unit);

[2] The electrode electrolyte for a polymer-type fuel cell according to the above [1], wherein the copolymer further includes a structure represented by the following Formula (II):

[Formula 2]

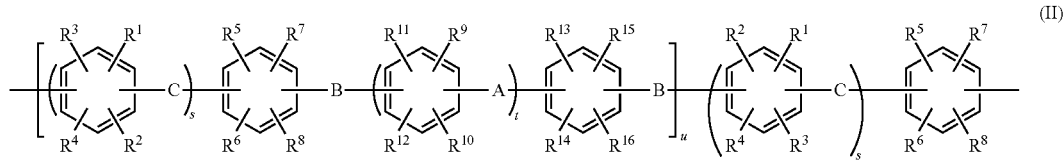

(in Formula (II), each A and C independently denotes a direct bond or at least one kind of structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—; each B independently denotes an oxygen atom or a sulfur atom; R$^1$ to R$^{16}$ may be the same or different from one another and each denote at least one kind of atom or group selected from the group consisting of hydrogen atoms, fluorine atoms, alkyl groups, halogenated alkyl groups that are partially or fully halogenated, allyl groups, aryl groups, nitro groups, and nitrile groups; s and t each denote an integer of 0 to 4; and u denotes 0 or an integer of 1 or more, and in single lines at the ends of each constitutional unit, a single line not showing a substituent on one side thereof means coupling with the adjacent constitutional unit);

[3] The electrode electrolyte for a polymer-type fuel cell according to the above [1] or [2], wherein Y denotes —CO— or —SO$_2$—; W and Z each denote a direct bond, —CO—, —SO$_2$—, —O—, or —S—; p and q are each an integer of 0 to 2; and r is an integer of 1 or 2;

[4] The electrode electrolyte for a polymer-type fuel cell according to the above [1] or [2], wherein Y denotes —CO— or —SO$_2$—; W and Z each denote a direct bond, —CO—, —SO$_2$—, —O—, or —S—; p and q are each an integer of 0 to 2; r is an integer of 1 or 2; and R$^{30}$ denotes a derivative derived from a compound selected from the group consisting of pyridine, imidazole, and triazole each having at least one substituent represented by —SO$_3$H, —O(CH$_2$)$_h$SO$_3$H, or —O(CF$_2$)$_h$SO$_3$H (h is an integer of 1 to 12), and derivatives thereof;

[5] The electrode electrolyte for a polymer-type fuel cell according to any of the above [1] to [4], wherein the copolymer is represented by the following Formula (III):

[Formula 3]

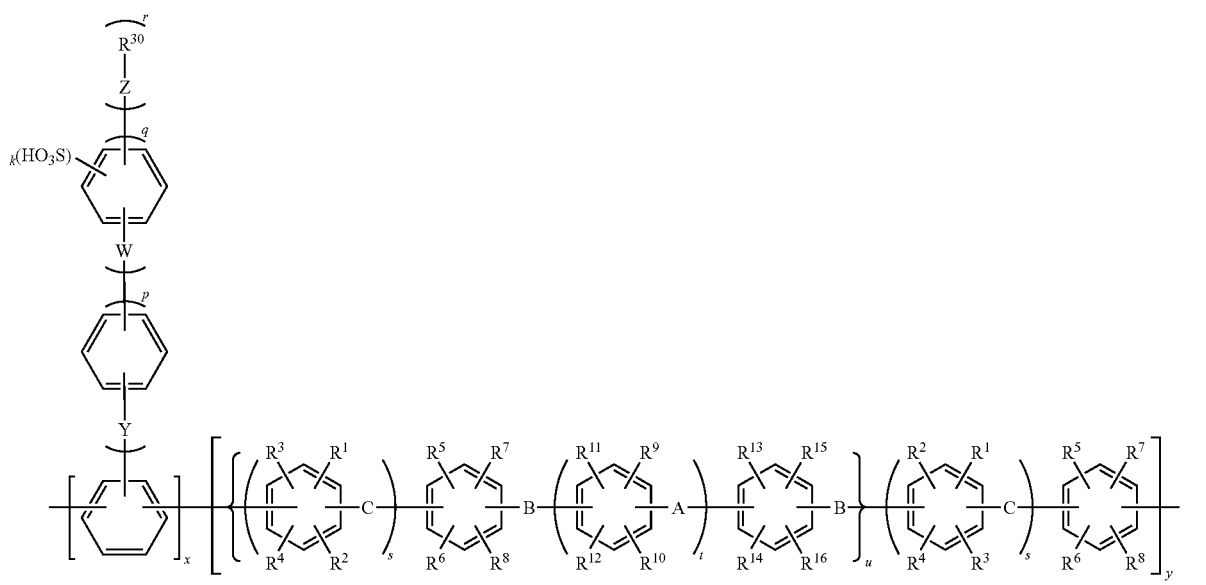

(in Formula (III), the definitions of A, B, C, W, Y, Z, k, p, q, r, s, t, u, $R^{30}$, and $R^1$ to $R^{16}$ are respectively equivalent to those of A, B, C, W, Y, Z, k, p, q, r, s, t, u, $R^{30}$, and $R^1$ to $R^{16}$ in Formulae (I) and (II); and x and y show mole fractions when x+y=100 mol %, and in single lines at the ends of each constitutional unit, a single line not showing a substituent on one side thereof means coupling with the adjacent constitutional unit);

[6] An electrode paste containing the electrolyte according to any of the above [1] to [5], catalyst particles, and a solvent;

[7] An electrode for a solid polymer-type fuel cell containing the electrolyte according to any of the above [1] to [5] and catalyst particles; and

[8] A membrane-electrode junction comprising the electrode according to the above [7] on at least one side of a polymer electrolyte membrane.

Advantages

According to the present invention, since the copolymer comprises an aromatic unit to which a nitrogen-containing heterocycle including a sulfonic acid group in a side chain is introduced and a unit not having a sulfonic acid group, an electrode electrolyte having high proton conductivity and enhanced mechanical strength can be obtained. In addition, according to the present invention, since the introduction of a sulfonic acid group by sulfonation is not necessary, it is possible to provide, without a complicated process, a solid polymer-type fuel cell electrode electrolyte being inexpensive, easy to recover a catalyst metal, excellent in proton conductivity, size stability, hot water resistance, and mechanical properties. In addition, the present invention provides an electrode paste, an electrode, and a catalyst-containing electrolyte membrane each including the electrolyte and thereby contributes to increased power generation performance of the solid polymer-type fuel cell.

BEST MODES FOR CARRYING OUT THE INVENTION

The present invention will be described below.

(Electrode Electrolyte)

The solid polymer-type fuel cell electrode electrolyte of the present invention includes a polyarylene polymer containing a strong acid segment obtained by introducing a specific constitutional unit into polyarylene.

Herein, a repeating constitutional unit in a polymer is referred to as a "unit", and, hereinafter, a repeating constitutional unit having hydrophobicity is sometimes referred to as a "hydrophobic unit", and a structural unit including a sulfonic acid group is sometimes referred to as a "sulfonic acid unit".

Polyarylene Polymer

In the copolymer used in the present invention, the main chain formed by polymerization of a monomer having a nitrogen-containing heterocycle including a sulfonic acid group in a side chain is a phenylene bond.

The copolymer, used in the present invention, having a nitrogen-containing heterocycle including a sulfonic acid group in a side chain includes a repeating constitutional unit having a sulfonic acid group (sulfonic acid unit) represented by the following Formula (I). More preferably, the copolymer includes a repeating constitutional unit represented by Formula (I) and a repeating constitutional unit not having a sulfonic acid group (hydrophobic unit) represented by Formula (II) below and is represented by Formula (III) below.

<Sulfonic Acid Unit>

[Formula 4]

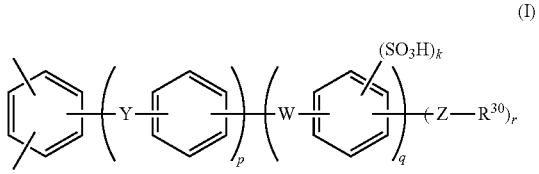

(I)

<Hydrophobic Unit>

[Formula 5]

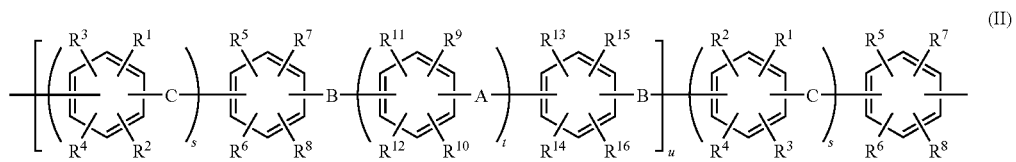

(II)

In Formula (I),

Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$— and is more preferably —CO— or —SO$_2$—. In single lines at the ends of each constitutional unit, a single line not showing a substituent on one side thereof means coupling with the adjacent constitutional unit.

W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S— and is more preferably a direct bond, —CO—, —SO$_2$—, —O—, or —S—.

Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$— and is more preferably a direct bond, —O—, —CO—, or —SO$_2$—. R$^{30}$ denotes a nitrogen-containing aromatic ring having at least one substituent represented by —SO$_3$H, —O(CH$_2$)$_h$SO$_3$H, or —O(CF$_2$)$_h$SO$_3$H (h is an integer of 1 to 12).

The nitrogen-containing heterocycle refers to one of organic compounds having cyclic structures and is a ring containing nitrogen in addition to carbon atoms. The cyclic structure may contain two or more nitrogen atoms and further may contain sulfur.

The nitrogen-containing heterocycle is preferably at least one type of group derived from a compound selected from the group consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine, and derivatives thereof; and is preferably imidazole, pyridine, or triazole.

p denotes an integer of 0 to 10, more preferably an integer of 0 to 4, and is further preferably an integer of 0 to 2.

q denotes an integer of 0 to 10, more preferably an integer of 0 to 4, and is further preferably an integer of 0 to 2.

r denotes an integer of 1 to 5, more preferably an integer of 1 to 3, and is further preferably an integer of 1 or 2.

k denotes an integer of 0 to 4, more preferably an integer of 0 to 3, and is further preferably an integer of 0 to 2.

In Formula (II), each A and C independently denotes a direct bond or at least one kind of structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—. Here, specific examples of the structure represented by —C(CR'$_2$)$_2$— in which R' is a cyclic hydrocarbon group include cyclohexylidene groups and fluorenylidene groups.

Among them, preferred are a direct bond, —CO—, —SO$_2$—, —C(CF$_3$)$_2$—, —C(CR'$_2$)$_2$— (R' is a hydrocarbon group or a cyclic hydrocarbon group), and —O—.

Each B independently denotes an oxygen atom or a sulfur atom, and an oxygen atom is preferred.

In single lines at the ends of each of the above-mentioned constitutional unit, a single line not showing a substituent on one side thereof means coupling with the adjacent constitutional unit.

R$^1$ to R$^{16}$ may be the same or different from one another and each denote at least one kind of atom or group selected from the group consisting of hydrogen atoms, fluorine atoms, alkyl groups, halogenated alkyl groups that are partially or fully halogenated, allyl groups, aryl groups, nitro groups, and nitrile groups.

Examples of the alkyl groups include a methyl group, an ethyl group, a propyl group, a butyl group, an amyl group, a hexyl group, a cyclohexyl group, and an octyl group. Examples of the halogenated alkyl groups include a trifluoromethyl group, a pentafluoroethyl group, a perfluoropropyl group, a perfluorobutyl group, a perfluoropentyl group, and a perfluorohexyl group. Examples of the allyl groups include a propenyl group, and examples of the aryl groups include a phenyl group and a pentafluorophenyl group.

s and t each denote an integer of 0 to 4. u denotes 0 or an integer of 1 or more, and the upper limit thereof is usually 100, preferably 1 to 80.

Examples of preferred combinations of the values of s and t and the structures of A, B, C, and R$^1$ to R$^{16}$ are as follows:
(1) s=1 and t=1, and a structure in which A is —C(CF$_3$)$_2$— or —C(CR'$_2$)$_2$— (R' is a hydrocarbon group or a cyclic hydrocarbon group), B is an oxygen atom, C is —CO— or —SO$_2$—, and R$^1$ to R$^{16}$ are each a hydrogen atom or a fluorine atom;

(2) s=1 and t=0, and a structure in which B is an oxygen atom, C is —CO— or —SO$_2$—, and R$^1$ to R$^{16}$ are each a hydrogen atom or a fluorine atom;

(3) s=0 and t=1, and a structure in which A is —C(CF$_3$)$_2$— or —C(CR'$_2$)$_2$— (R' is a hydrocarbon group or a cyclic hydrocarbon group), B is an oxygen atom, and R$^1$ to R$^{16}$ are each a hydrogen atom, a fluorine atom, or a nitrile group;

(4) s=1 and t=1 or 2, and a structure in which A is —C(CF$_3$)$_2$— or —C(CR'$_2$)$_2$— (R' is a hydrocarbon group or a cyclic hydrocarbon group), B is an oxygen atom, and R$^1$ to R$^{16}$ are each a hydrogen atom or a fluorine atom; and (5) s=0 and t=1 or 2, and a structure in which A is —C(CF$_3$)$_2$— or —C(CR'$_2$)$_2$— (R' is a hydrocarbon group or a cyclic hydrocarbon group), B is an oxygen atom, and R$^1$ to R$^{16}$ are each a hydrogen atom, a fluorine atom or a nitrile group.

<Polymer Structure>

137444, a monomer having a sulfonic acid ester group that can become a structural unit represented by Formula (I) and a monomer or oligomer that can become a structural unit represented by Formula (II) are copolymerized to produce polyarylene having the sulfonic acid ester group, and the sulfonic acid ester group is converted into a sulfonic acid group by deesterification to synthesize a copolymer having the sulfonic acid group.

(Method B) For example, by the method described in Japanese Unexamined Patent Application Publication No. 2001-342241, a monomer having a skeleton represented by Formula (I) and not having a sulfonic acid group and a sulfonic acid ester group and a monomer or oligomer that can become a structural unit represented by Formula (II) are copolymerized, and the resulting copolymer is sulfonated using a sulfonating agent to synthesize a copolymer having the sulfonic acid group. The sulfonated polyarylene of the present invention is preferably produced by method A.

[Formula 6]

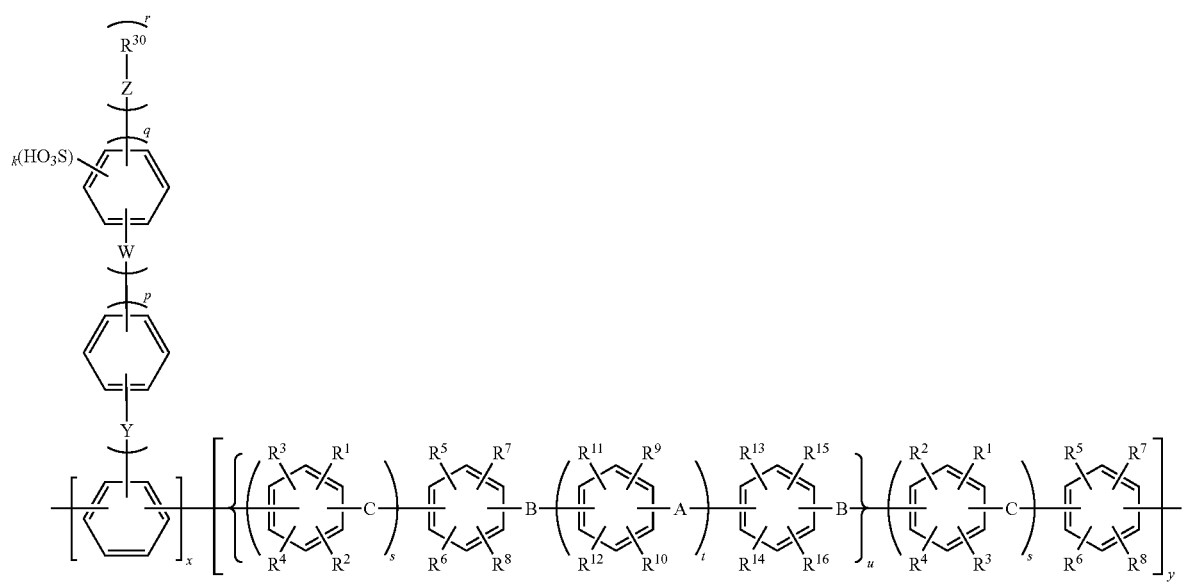

(III)

In Formula (III), the definitions of A, B, C, W, Y, Z, k, p, q, r, s, t, u, R$^{30}$, and R$^1$ to R$^{16}$ are respectively equivalent to those of A, B, C, W, Y, Z, k, p, q, r, s, t, u, R$^{30}$, and R$^1$ to R$^{16}$ in Formulae (I) and (II); and x and y show mole fractions when x+y=100 mol %. In single lines at the ends of each constitutional unit, a single line not showing a substituent on one side thereof means coupling with the adjacent constitutional unit.

The copolymer having a sulfonic acid group used in the present invention includes the repeating constitutional unit represented by Formula (II), i.e., the unit x, at a ratio of 0.5 to 100 mol%, preferably 10 to 99.999 mol%, and the repeating constitutional unit represented by Formula (III), i.e., the unit y, at a ratio of 99.5 to 0 mol%, preferably 90 to 0.001 mol%.

<Method of Producing Polymer>

The copolymer having a sulfonic acid group can be produced by, for example, any of the following two methods, method A or method B.

(Method A) For example, by the method described in Japanese Unexamined Patent Application Publication No. 2004-

Examples of the sulfonic acid monomer, used in Method A, that can become a structural unit represented by Formula (I) include aromatic compounds represented by the following Formula (1).

[Formula 7]

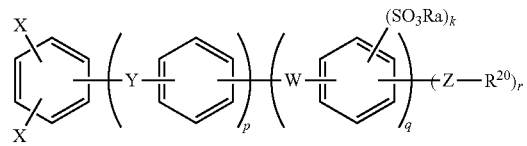

(1)

In Formula (1), each X denotes an atom or a group selected from halogen atoms (chlorine, bromine, and iodine) excluding fluorine atoms and —OSO$_2$Rb. Here, Rb denotes an alkyl group, a fluorine-substituted alkyl group, or an aryl group, and specific examples thereof include a methyl group, an ethyl group, a trifluoromethyl group, and a phenyl group.

Examples of Y, W, Z, p, and q are the same as those in Formula (1) (III) above.

Ra denotes a hydrocarbon group having 1 to 20 carbon atoms and is more preferably a hydrocarbon group having 4 to 20 carbon atoms. Specific examples thereof include straight-chain hydrocarbon groups, branched hydrocarbon groups, alicyclic hydrocarbon groups, and hydrocarbon groups having 5-membered heterocycles, such as a methyl group, an ethyl group, an n-propyl group, an iso-propyl group, a tert-butyl group, an iso-butyl group, an n-butyl group, a sec-butyl group, a neopentyl group, a cyclopentyl group, a hexyl group, a cyclohexyl group, a cyclopentylmethyl group, a cyclohexylmethyl group, an adamantyl group, an adamantanemethyl group, a 2-ethylhexyl group, a bicyclo[2.2.1]heptyl group, a bicyclo[2.2.1]heptylmethyl group, a tetrahydrofurfuryl group, a 2-methylbutyl group, a 3,3-dimethyl-2,4-dioxolanemethyl group, a cyclohexylmethyl group, an adamantylmethyl group, and a bicyclo[2.2.1]heptylmethyl group. Among them, preferred are an n-butyl group, a neopentyl group, a tetrahydrofurfuryl group, a cyclopentyl group, a cyclohexyl group, a cyclohexylmethyl group, an adamantylmethyl group, and a bicyclo[2.2.1]heptylmethyl group; and further preferred is a neopentyl group.

$R^{20}$ denotes a nitrogen-containing heterocycle having at least one substituent represented by —$SO_3Rc$, —$O(CH_2)_hSO_3Rc$, or —$O(CF_2)_hSO_3Rc$ (h is an integer of 1 to 12, and Rc denotes a hydrocarbon group having 1 to 20 carbon atoms). Rc is more preferably a hydrocarbon group having 4 to 20 carbon atoms. Specific examples thereof include straight-chain hydrocarbon groups, branched hydrocarbon groups, alicyclic hydrocarbon groups, and hydrocarbon groups having 5-membered heterocycles, such as a methyl group, an ethyl group, an n-propyl group, an iso-propyl group, a tert-butyl group, an iso-butyl group, an n-butyl group, a sec-butyl group, a neopentyl group, a cyclopentyl group, a hexyl group, a cyclohexyl group, a cyclopentylmethyl group, a cyclohexylmethyl group, an adamantyl group, an adamantanemethyl group, a 2-ethylhexyl group, a bicyclo[2.2.1]heptyl group, a bicyclo[2.2.1]heptylmethyl group, a tetrahydrofurfuryl group, a 2-methylbutyl group, a 3,3-dimethyl-2,4-dioxolanemethyl group, a cyclohexylmethyl group, an adamantylmethyl group, and a bicyclo[2.2.1]heptylmethyl group. Among them, preferred are an n-butyl group, a neopentyl group, a tetrahydrofurfuryl group, a cyclopentyl group, a cyclohexyl group, a cyclohexylmethyl group, an adamantylmethyl group, and a bicyclo[2.2.1]heptylmethyl group; and further preferred is a neopentyl group.

Specific examples of such aromatic compounds include the following structures.

[Formula 8]

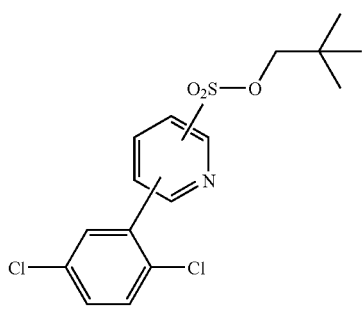

-continued

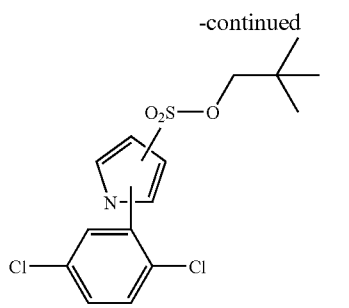

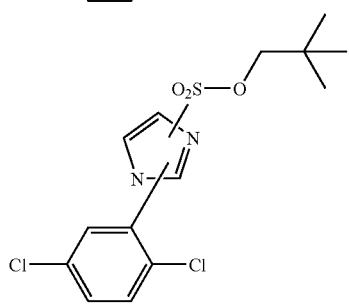

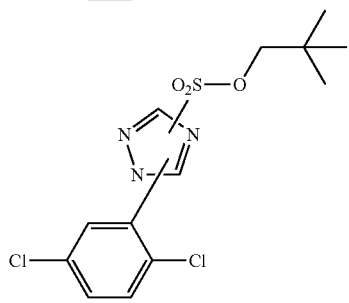

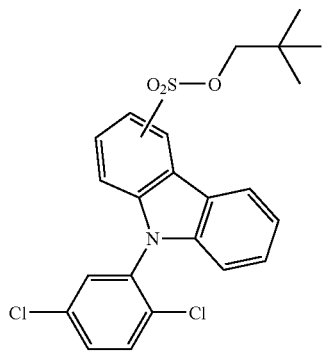

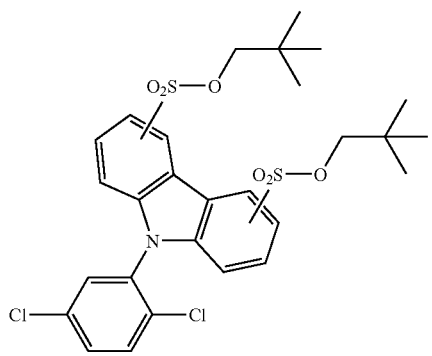

[Formula 9]
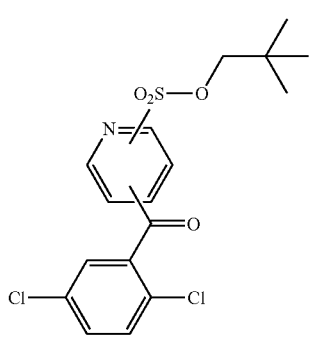
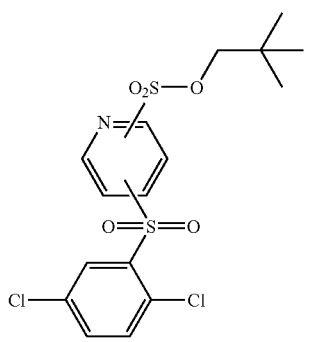
[Formula 10]
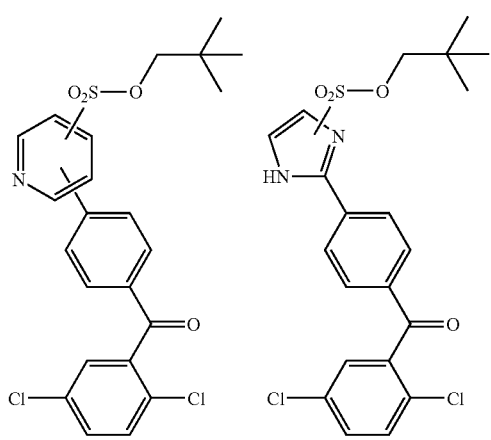
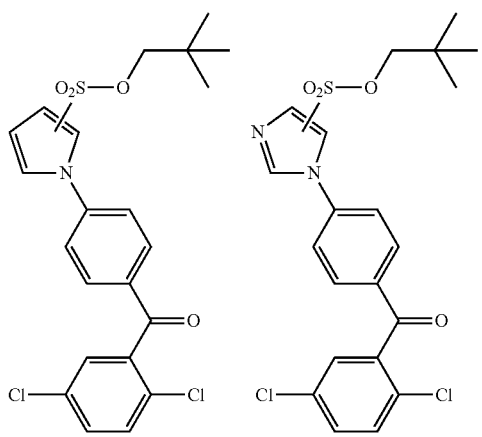
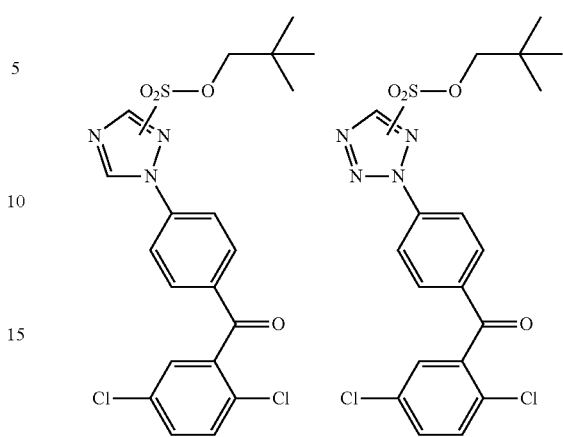
[Formula 11]
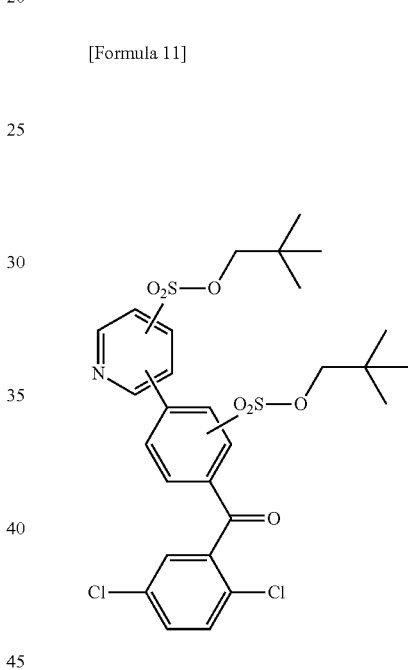
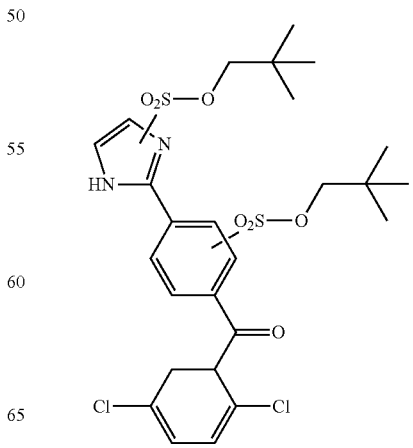

[Formula 12]
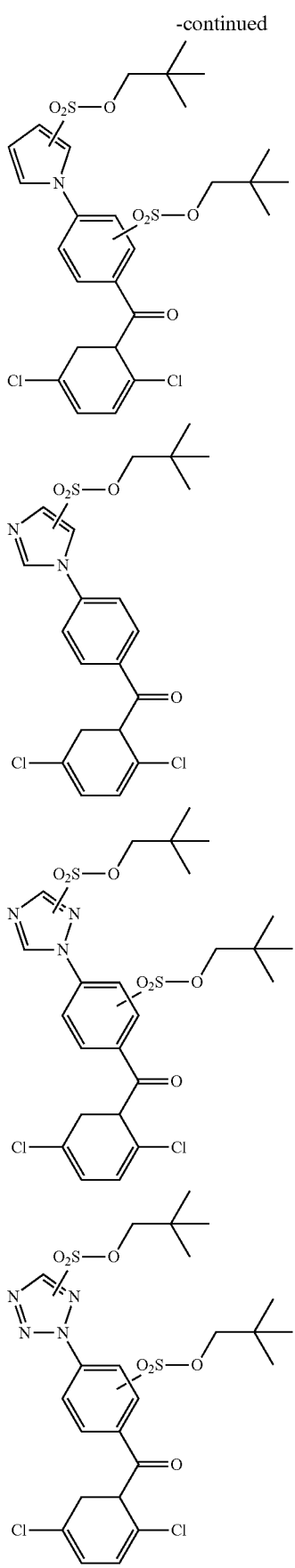
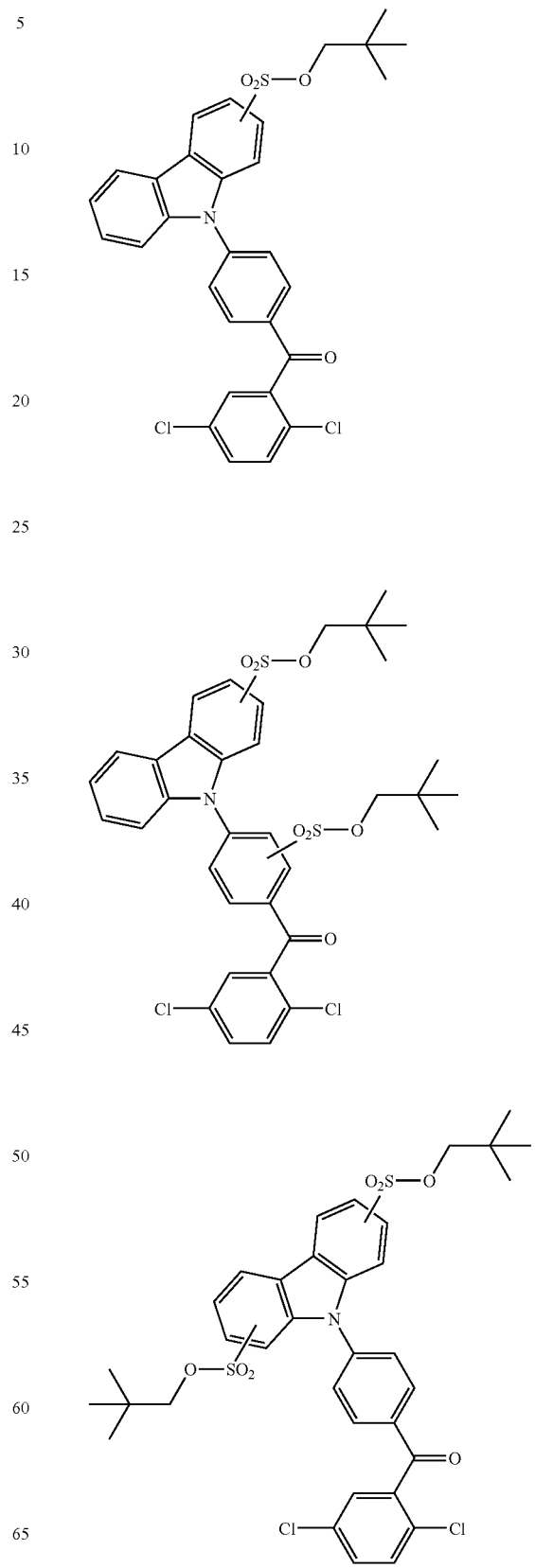

[Formula 13]
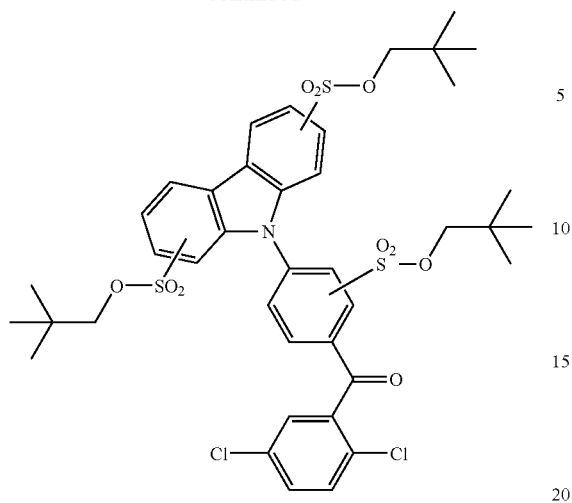
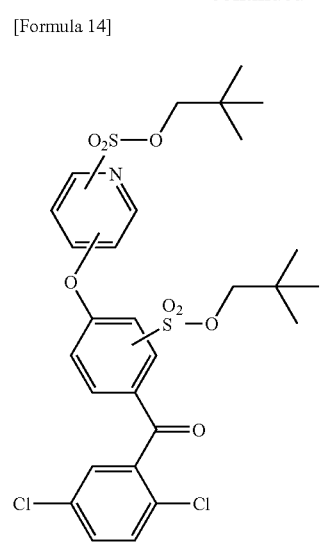
[Formula 14]
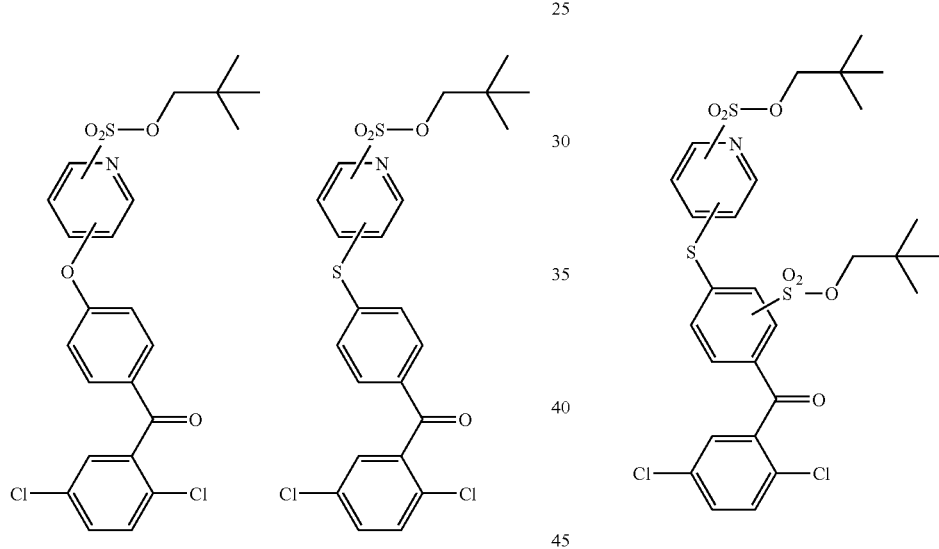
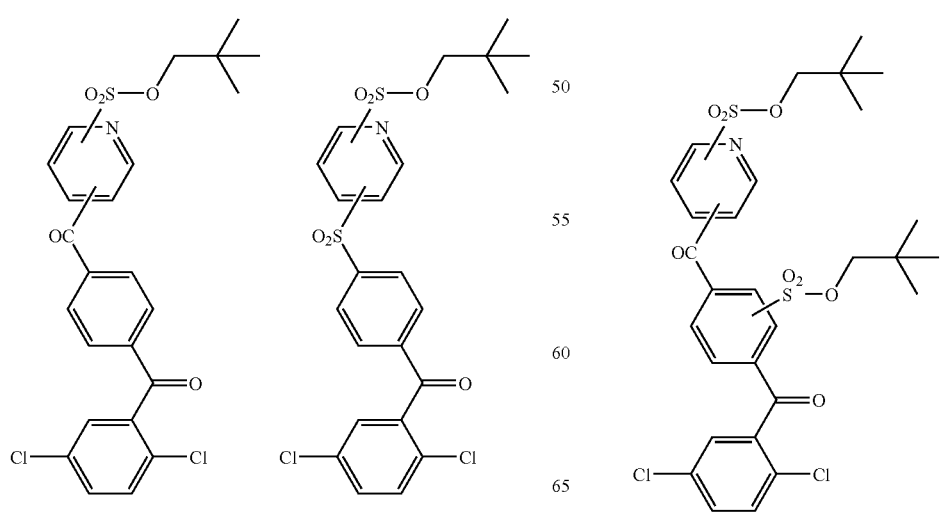

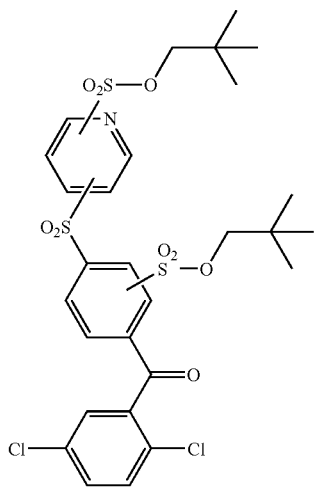
[Formula 15]
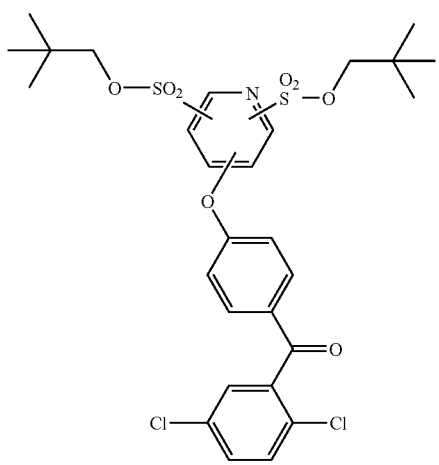
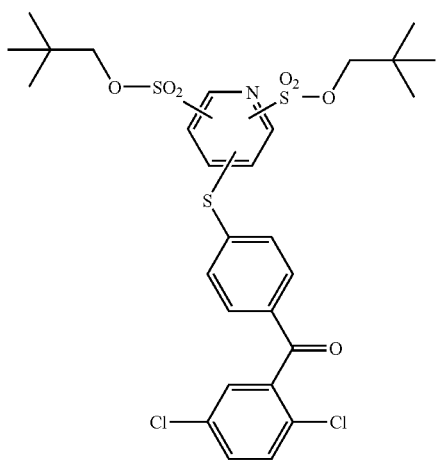
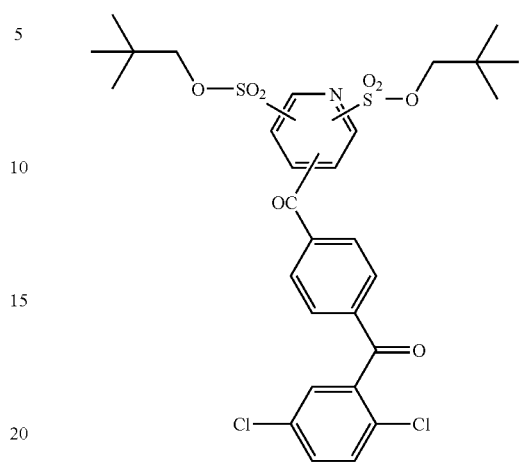
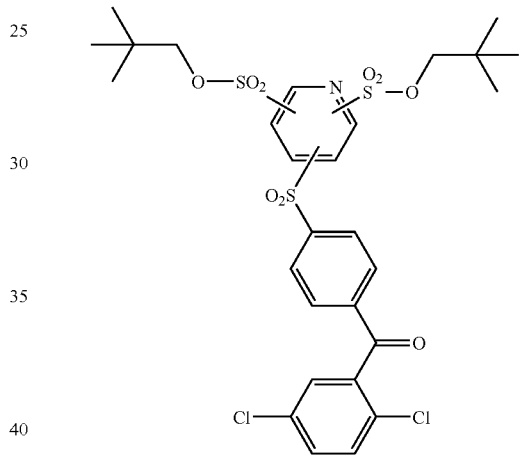
[Formula 16]
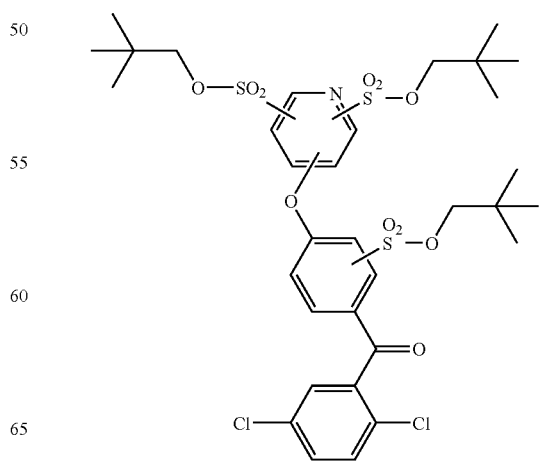

[Formula 17]
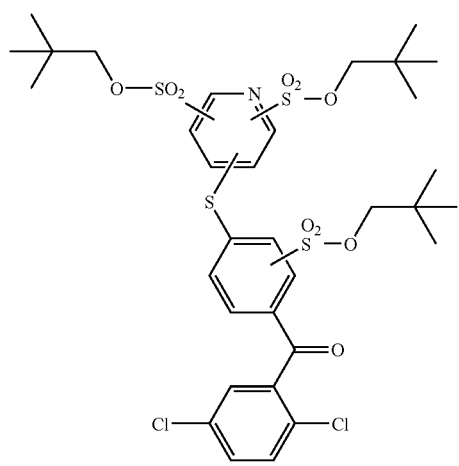
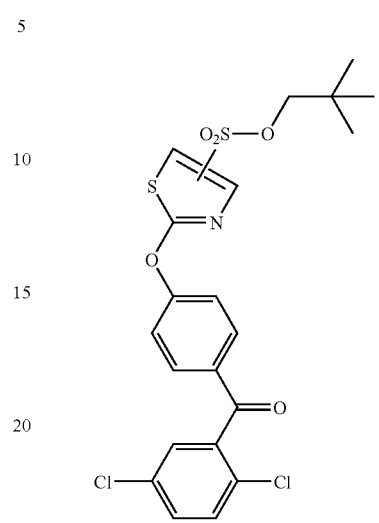
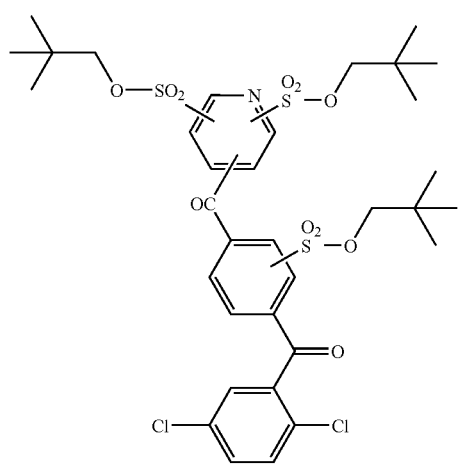
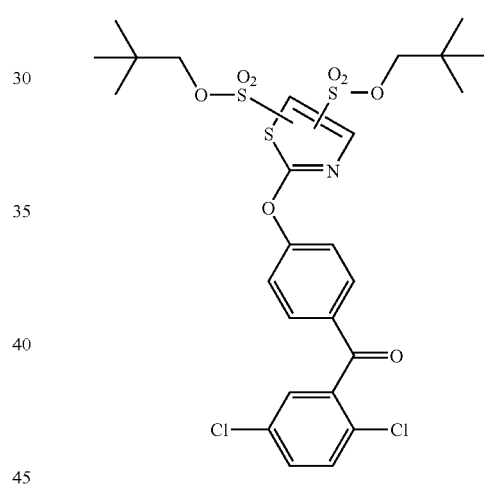
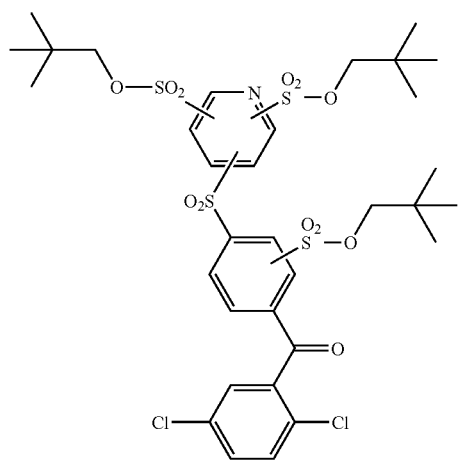
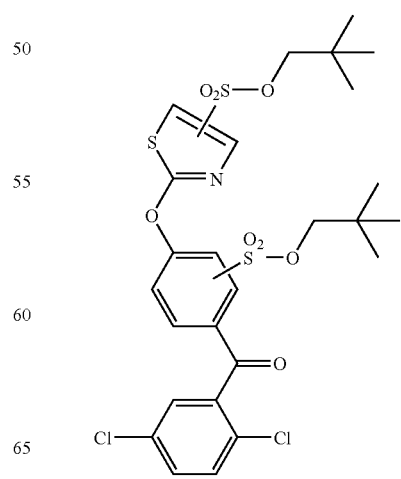

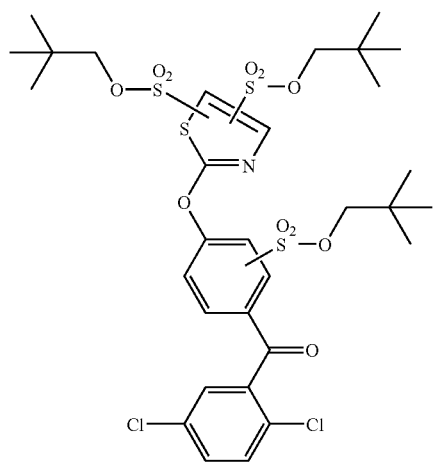
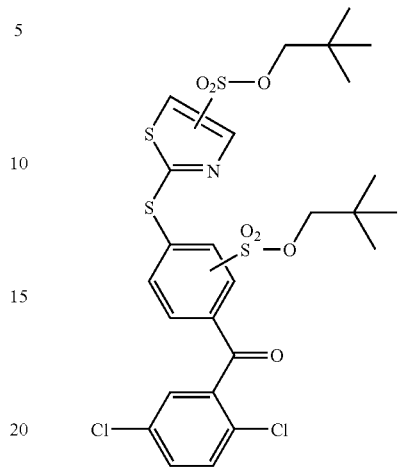
[Formula 18]
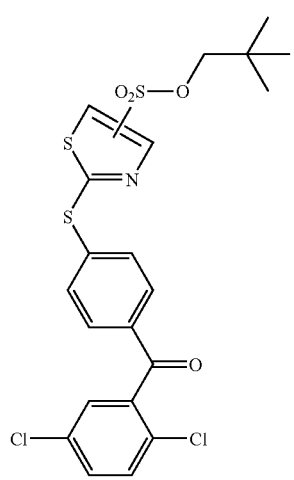
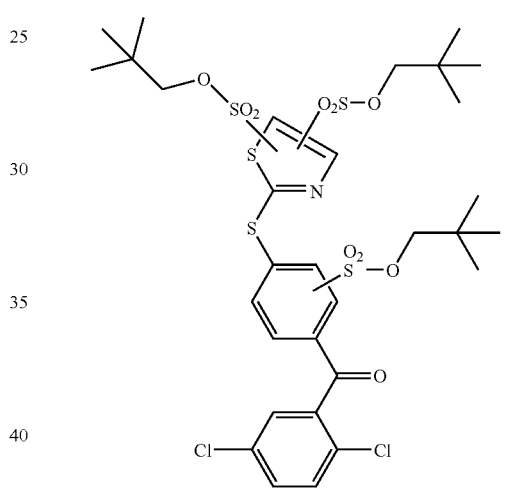
[Formula 19]
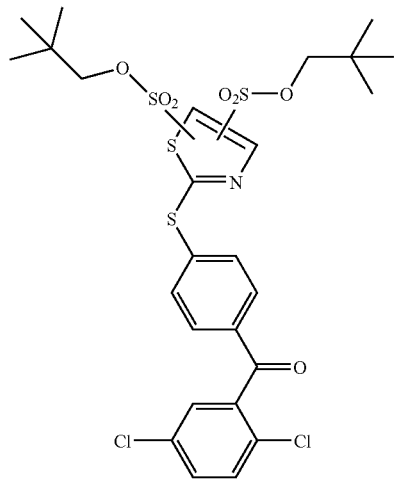
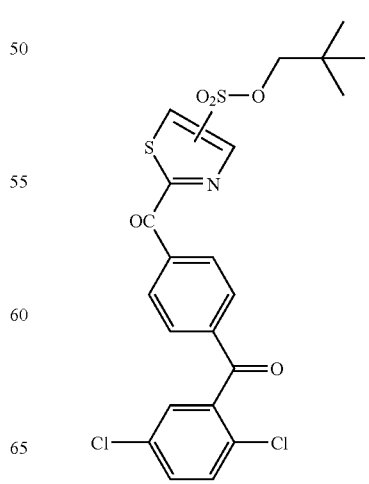

[Formula 20]
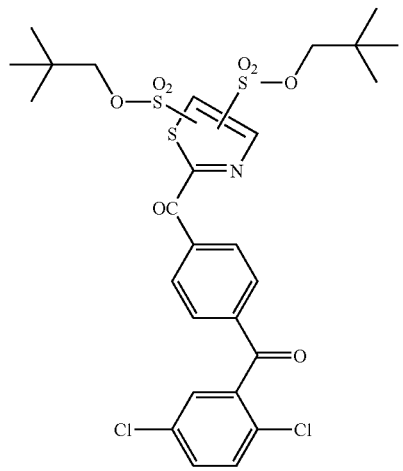
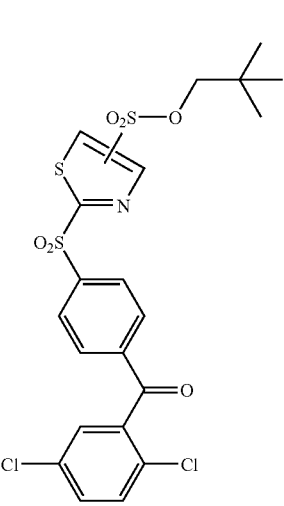
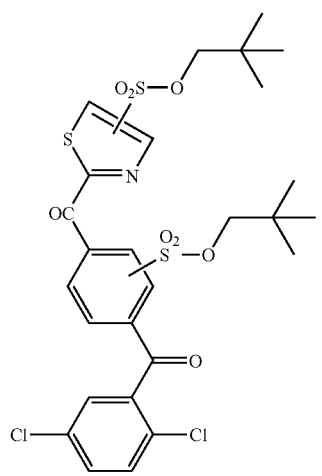
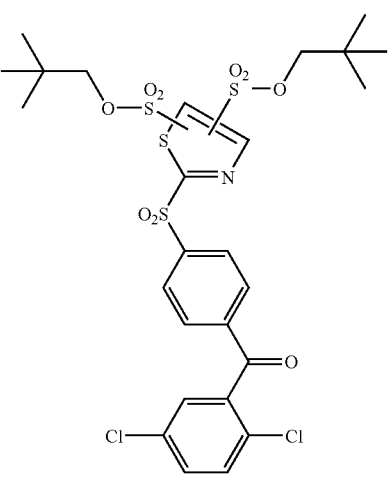
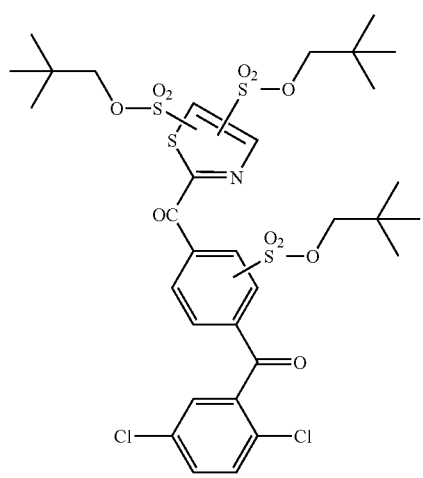
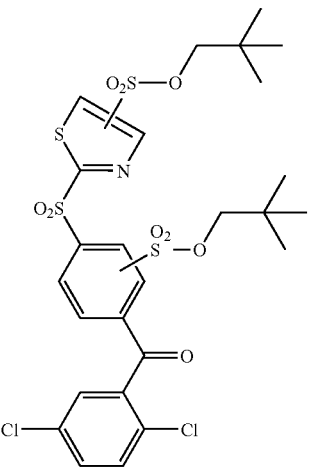

[Formula 21]
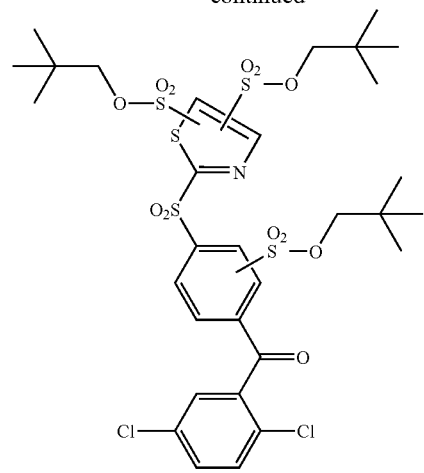
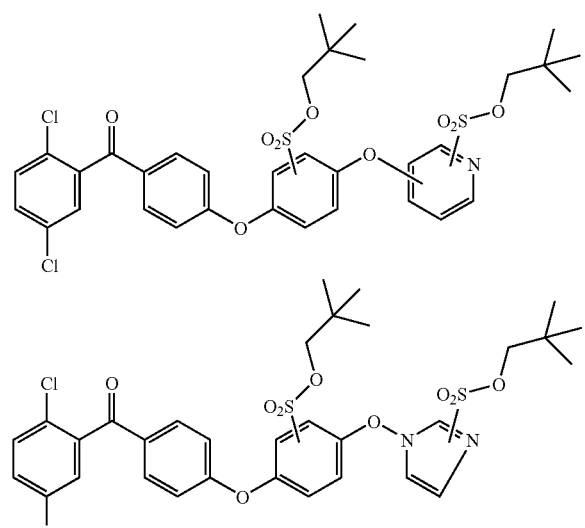
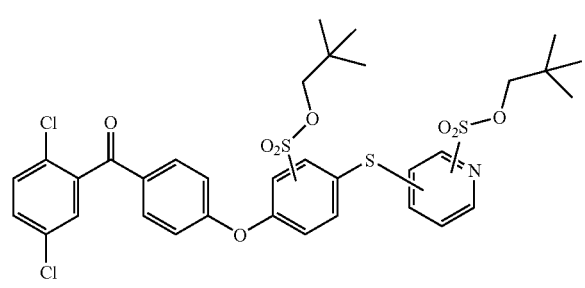
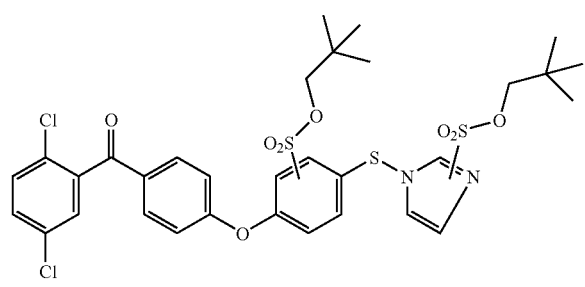
[Formula 22]
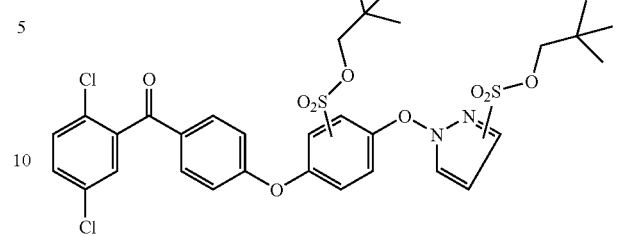
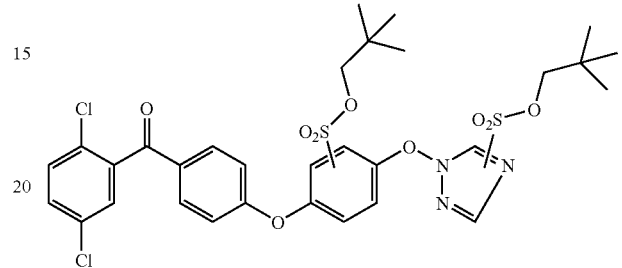
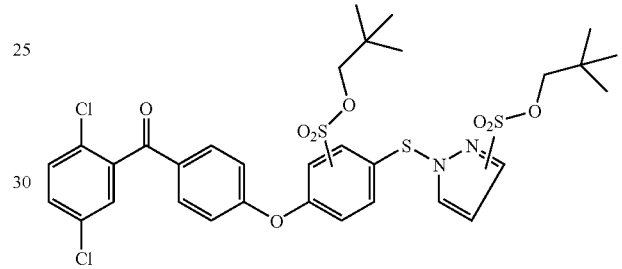
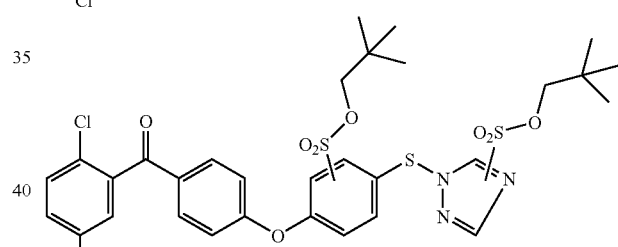
[Formula 23]
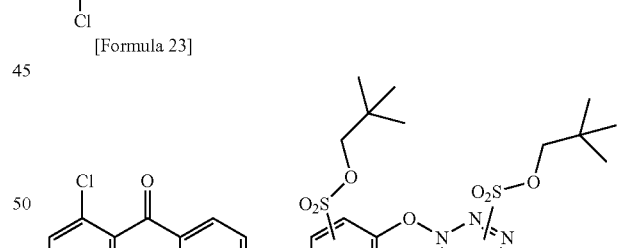
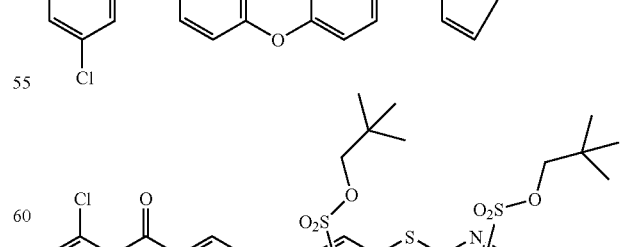
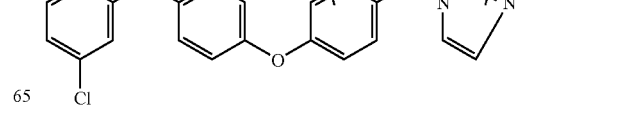

The monomer not having sulfonic acid that can be used in Method B and can become the structural unit represented by Formula (I) is represented by the following Formula (4).

[Formula 24]

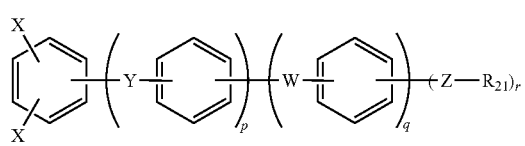

(4)

In Formula (4), the definitions of X, Y, Z, W, p, q, and r are the same as those in Formulae (I) and (1).

$R^{21}$ denotes a nitrogen-containing heterocycle, and specific examples thereof include compounds selected from the group consisting of nitrogen-containing heterocycles consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine, and derivatives thereof. Also included are compounds in which chlorine atoms of the above-mentioned compounds are substituted by bromine atoms and compounds in which —CO— of the above-mentioned compounds is substituted by —$SO_2$—. The cyclic structure may contain two or more nitrogen atoms and further may contain sulfur.

In order to obtain polyarylene having a sulfonic acid group, it is necessary to first obtain polyarylene serving as a precursor by copolymerizing a monomer that can become a structural unit represented by Formula (I) and a monomer or oligomer that can become a structural unit represented by Formula (II).

The copolymerization is carried out under the presence of a catalyst, and the catalyst used here is a catalyst system containing a transition metal compound. The catalyst system includes, as essential components, (1) a transition metal salt and a compound serving as a ligand (hereinafter, referred to as "ligand component") or a transition metal complex (including a copper salt) in which a ligand is coordinated and (2) a reducing agent, and further may include a "salt" for increasing the polymerization rate.

Specific examples of the catalyst component and the polymerization conditions, such as the ratio of each component used, the reaction solvent, concentration, temperature, and time, are those for the compound described in Japanese Unexamined Patent Application Publication No. 2001-342241.

The polyarylene having a sulfonic acid group can be obtained by converting polyarylene as the precursor into polyarylene having a sulfonic acid group. As the method for this, the following three methods are known.

(Method A) Polyarylene having a sulfonic acid ester group as a precursor is deesterified by the method described in Japanese Unexamined Patent Application Publication No. 2004-137444.

(Method B) Polyarylene as a precursor is sulfonated by the method described in Japanese Unexamined Patent Application Publication No. 2001-342241.

(Method C) An alkylsulfonic acid group is introduced into polyarylene as a precursor by the method described in Japanese Patent Application No. 2003-295974 (Japanese Unexamined Patent Application Publication No. 2005-60625).

The ion-exchange capacity of the polyarylene having a sulfonic acid group of Formula (lll) produced by a method as in above is usually 0.3 to 5 meq/g, preferably 0.5 to 3 meq/g, and further preferably 0.8 to 2.8 meq/g. An ion-exchange capacity lower than 0.3 meq/g is low in the proton conductivity, resulting in low power generation performance. On the other hand, an ion-exchange capacity higher than 5 meq/g may undesirably reduce the water resistance significantly.

The above-mentioned ion-exchange capacity can be controlled by, for example, changing the types, ratios, and combination of the precursor monomer that can become the structural unit represented by Formula (I) and the monomer or oligomer that can become the structural unit represented by Formula (II).

The molecular weight of the thus-obtained polyarylene having a sulfonic acid group is 10000 to 1000000, preferably 20000 to 800000, as a weight-average molecular weight in terms of polystyrene measured by gel permeation chromatography (GPC).

Since the polyarylene polymer includes a constitutional unit derived from a novel polysulfonated monomer, the ion exchange capacity thereof can be significantly increased, compared to the cases in which conventional monosulfonated monomers are used, and also tends to have high proton conductivity, compared to conventional polymers. Therefore, even when the composite ratio of the unit not having a sulfonic acid group in a copolymer is increased, the copolymer can be synthesized so as to have a high concentration of sulfonic acid, and material design excellent in hot water resistance and mechanical properties is possible. Such a polymer can be suitably applied to a proton-conductive membrane of a fuel cell, an electrode electrolyte, or an adhesive. Furthermore, the electrode electrolyte including the polyarylene polymer is suitable as a membrane-electrode junction.

The electrode electrolyte according to the present invention may be constituted of only the above-described polymer or may further contain another electrolyte, as long as the above-described polymer is contained. Examples of the another electrolyte include sulfonated vinyl polymers such as perfluorocarbon polymers and polystyrenesulfonic acid, represented by Nafion, Flemion, and Aciplex, which have been conventionally used; and organic polymers in which a sulfonic acid group or a phosphoric acid group is introduced to a heat-resistant polymer such as polybenzimidazole or polyetheretherketone. When the another electrolyte is included, it is desirable that the using ratio thereof be 50 wt % or less, preferably 30 wt % or less, based on the total amount of the electrode electrolyte.

(Electrode Paste)

The electrode paste of the present invention is composed of the above-described electrode electrolyte, catalyst particles, and a solvent and may contain other components such as a dispersing agent and carbon fiber, according to need.

Catalyst Particles

The catalyst particles are composed of a catalyst and a carrier of carbon or a metal oxide on which the catalyst is immobilized or are made of a catalyst alone.

As the catalyst, platinum or a platinum alloy is used. The use of a platinum alloy can further provide stability and activity as an electrode catalyst. The platinum alloy is preferably an alloy of platinum and at least one selected from platinum-group metals (ruthenium, rhodium, palladium, osmium, and iridium) other than platinum, iron, cobalt, titanium, gold, silver, chromium, manganese, molybdenum, tungsten, aluminum, silicon, rhenium, zinc, and tin. The platinum alloy may contain an intermetallic compound of platinum and the metal alloyed with platinum.

The catalyst is in a form of catalyst particles even if it is used alone or is immobilized on a carrier.

The carrier on which the catalyst is immobilized is preferably carbon black such as oil-furnace black, channel black, lamp black, thermal black, or acetylene black, from the standpoints of the electron conductivity and the size of specific surface. In addition, for example, natural graphite, artificial graphite obtained from an organic compound such as pitch, coke, polyacrylonitrile, a phenol resin, or a furan resin, and carbon may be used.

Examples of the oil-furnace black include "Vulcan XC-72", "Vulcan P", "Black Pearls 880", "Black Pearls 1100", "Black Pearls 1300", "Black Pearls 2000", and "Regal 400" manufactured by Cabot Corp., "Ketjen Black EC" manufactured by Lion Corp., and "#3150, #3250" manufactured by Mitsubishi Chemical Corp. Furthermore, examples of the acetylene black include "Denka Black" manufactured by Denki Kagaku Kogyo Kabushiki Kaisha.

The carbon can be used in a form of particles or fiber. The amount of the catalyst immobilized on the carbon is not particularly limited, as long as the catalyst activity can be effectively exhibited, but is in the range of 0.1 to 9.0 g-metal/g-carbon, preferably 0.25 to 2.4 g-metal/g-carbon.

Furthermore, the carrier, other than carbon, may be a metal oxide such as t tania, zinc oxide, silica, ceria, alumina, alumina-spinel, magnesia, or zirconia.

Solvent

The solvent of the electrode paste of the present invention is not particularly limited, as long as it can dissolve or disperse the electrolyte. Furthermore, not only one kind of solvent but also a combination of two or more kinds of solvents may be used.

Examples of the solvent include water;

alcohols such as methanol, ethanol, n-propyl alcohol, 2-propanol, 2-methyl-2-propanol, 2-butanol, n-butyl alcohol, 2-methyl-1-propanol, 1-pentanol, 2-pentanol, 3-pentanol, 2-methyl-1-butanol, 3-methyl-1-butanol, 2-methyl-2-butanol, 3-methyl-2-butanol, 2,2-dimethyl-1-propanol, cyclohexanol, 1-hexanol, 2-methyl-1-pentanol, 2-methyl-2-pentanol, 4-methyl-2-pentanol, 2-ethyl-1-butanol, 1-methyl cyclohexanol, 2-methyl cyclohexanol, 3-methyl cyclohexanol, 4-methyl cyclohexanol, 1-octanol, 2-octanol, 2-ethyl-1-hexanol, 2-methoxyethanol, 2-ethoxyethanol, 2-(methoxymethoxy)ethanol, 2-isopropoxyethanol, 1-methoxy-2-propanol, and 1-ethoxy -2-propanol;

polyols such as ethylene glycol, propylene glycol, and glycerol;

ethers such as dioxane, tetrahydrofuran, tetrahydropyrane, diethyl ether, diisopropyl ether, di-n-propyl ether, butyl ether, phenyl ether, isopentyl ether, 1,2-dimethoxyethane, diethoxyethane, bis(2-methoxyethyl)ether, bis(2-ethoxyethyl)ether, cineol, benzyl ethyl ether, anisole, phenetole, and acetal;

ketones such as acetone, methyl ethyl ketone, 2-pentanone, 3-pentanone, cyclopentanone, cyclohexanone, 2-hexanone, 4-methyl-2-pentanone, 2-heptanone, 2,4-dimethyl-3-pentanone, and 2-octanone;

esters such as γ-butyrolactone, ethyl acetate, propyl acetate, n-butyl acetate, isobutyl acetate, sec-butyl acetate, pentyl acetate, isopentyl acetate, 3-methoxybutyl acetate, methyl butyrate, ethyl butyrate, methyl lactate, ethyl lactate, and butyl lactate;

non-proton polar solvents such as dimethyl sulfoxide, N-methyl formamide, N,N-dimethyl formamide, N,N-diethyl formamide, N,N-dimethyl acetamide, N-methyl-2-pyrrolidone, and tetramethyl urea; and hydrocarbon solvents such as toluene, xylene, hexane, heptane, and octane. These may be used alone or in a combination.

Dispersing agent

Examples of the dispersing agent, which may be contained according to need, include anionic surfactants such as oleic acid/N-methyl taurine, potassium oleate/diethanolamine salts, alkyl ether sulfate/triethanolamine salts, polyoxyethylene alkyl ether sulfate/triethanolamine salts, amine salts of specially modified polyether ester acids, amine salts of higher fatty acid derivatives, amine salts of specially modified polyester acids, amine salts of high molecular weight polyether ester acids, amine salts of specially modified phosphate esters, amideamine salts of high molecular weight polyester acids, amideamine salts of specific fatty acid derivatives, alkylamine salts of higher fatty acids, amideamine salts of high molecular weight polycarboxylic acids, sodium laurate, sodium stearate, sodium oleate, lauryl sulfuric acid ester sodium salts, cetyl sulfuric acid ester sodium salts, stearyl sulfuric acid ester sodium salts, oleyl sulfuric acid ester sodium salts, lauryl ether sulfuric acid ester salts, sodium alkylbenzene sulfonates, oil-soluble alkylbenzene sulfonic acid salts, α-olefin sulfonic acid salts, higher alcohol phosphoric acid monoester disodium salts, higher alcohol phosphoric acid diester disodium salts, and zinc dialkyl dithiophosphates; cationic surfactants such as benzyldimethyl{2-[2-(P-1,1,3,3-tetramethylbutylphenoxy)ethoxy]ethyl}ammonium chloride, octadecylamine acetates tetradecylamine acetate, octadecyl trimethyl ammonium chloride, beef tallow trimethyl ammonium chloride, dodecyl trimethyl ammonium chloride, palm trimethyl ammonium chloride, hexadecyl trimethyl ammonium chloride, behenyl trimethyl ammonium chloride, palm dimethyl benzyl ammonium chloride, tetradecyl dimethyl benzyl ammonium chloride, octadecyl dimethyl benzyl ammonium chloride, dioleyl dimethyl ammonium chloride, 1-hydroxyethyl-2-beef tallow imidazoline quaternary salts, 2-heptadecenyl-hydroxyethyl imidazoline, stearamide ethyl diethylamine acetate, stearamide ethyl diethylamine hydrochloride, triethanolamine monostearate formate, alkylpyridinium salts, higher alkylamine ethylene oxide adducts, polyacrylamideamine salts, modified polyacrylamideamine salts, and perfluoroalkyl quaternary ammonium iodides; amphoteric surfactants such as dimethyl palm betaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-[ω-fluoroalkanoyl-N-ethylamino]-1-propanesulfonate, and N-[3-(perfluorooctanesulfonamide)propyl]-N,N-dimethyl-N-carboxymethylene ammonium betaine; nonionic surfactants such as palm fatty acid diethanolamide (1:2 type), palm fatty acid diethanolamide (1:1 type), beef fatty acid diethanolamide (1:2 type), beef fatty acid diethanolamide (1:1 type), oleic acid diethanolamide (1:1 type), hydroxyethyl laurylamine, polyethylene glycol laurylamine, polyethylene glycol palm amine, polyethylene glycol stearylamine, polyethylene glycol beef tallow amine, polyethylene glycol beef tallow propylenediamine, polyethylene glycol dioleylamine, dimethyl laurylamine oxide, dimethyl stearylamine oxide, dihydroxyethyl laurylamine oxide, perfluoroalkylamine oxide, polyvinyl pyrrolidone, higher alcohol ethylene oxide adducts, alkyl phenol ethylene oxide adducts, fatty acid ethylene oxide adducts, polypropylene glycol ethylene oxide adducts, fatty acid esters of glycerin, fatty acid esters of pentaerythritol, fatty acid esters of sorbitol, fatty acid esters of sorbitan, and fatty acid These dispersing agents may be used alone or in a combination of two or more thereof. Among them, preferred are surfactants having basic groups, more preferably anionic or cationic surfactants, and further preferably surfactants with molecular weights of from 5000 to 30000.

The addition of the above-mentioned dispersing agent to the electrode paste provides excellent storage stability and fluidity and increases productivity in a coating process.

Carbon Fiber

The electrode paste according to the present invention may further contain, according to need, carbon fiber not carrying a catalyst.

Examples of the carbon fiber used in the present invention according to need include rayon-based carbon fiber, PAN-based carbon fiber, lignin-poval-based carbon fiber, pitch-based carbon fiber, and vapor-phase grown carbon fiber. Among them, preferred is vapor-phase grown carbon fiber.

The addition of the carbon fiber to the electrode paste increases the pore volume of the electrode, resulting in improvements in diffusion properties of a fuel gas and an oxygen gas. Furthermore, the addition decreases flooding or the like due to generated water, resulting in an improvement in power generation performance.

Other Additive

The electrode paste according to the present invention may further contain other components according to need. For example, the electrode paste may contain a water-repellent agent such as a fluorine-based polymer or a silicon-based polymer. The water-repellent agent has an effect of efficiently discharging generated water and hence contributes to an improvement in power generation performance.

Composition

It is desirable that the weight ratio of the catalyst particles contained in the paste according to the present invention be from 1 to 20 wt %, preferably from 3 to 15 wt. In addition, it is preferable that the weight ratio of the electrode electrolyte used be from 0.5 to 30 wt %, preferably from 1 to 15 wt %. Furthermore, it is desirable that the weight ratio of the solvent used be from 5 to 95 wt %, preferably from 15 to 90 wt %.

The weight ratio of the dispersing agent used according to need is from 0 to 10 wt %, preferably from 0 to 2 wt %. The weight ration of the carbon fiber used according to need is from 0 to 20 wt %, preferably from 1 to 10 wt % (it is noted that the total amount does not exceed 100 wt %).

When the catalyst particles are used at a ratio lower than the above-mentioned range, the electrode reaction rate may be decreased. On the contrary, when the ratio is higher than the above-mentioned range, the viscosity of the electrode paste may be increased, resulting in an occurrence of uneven coating in the coating process.

When the electrolyte is used at a ratio lower than the above-mentioned range, the proton conductivity is reduced, and, in addition, the electrolyte cannot act as a binder, resulting in not forming an electrode. On the contrary, when the ratio is higher than the above-mentioned range, the pore volume of the electrode is reduced.

When the solvent is used at a ratio within the above-mentioned range, the electrode can sufficiently secure a pore volume that is necessary for power generation. In addition, a ratio within the above-mentioned range is suitable for handling as a paste.

When the dispersing agent is used at a ratio within the above-mentioned range, the electrode paste having excellent storage stability can be obtained. When the carbon fiber is used at a ratio lower than the above-mentioned range, the effect of increasing the pore volume of the electrode is low. On the contrary, when the ratio is higher than the above-mentioned range, the electrode reaction rate may be reduced.

Preparation of Paste

The electrode paste according to the present invention can be prepared by, for example, mixing each component described above at predetermined ratios and kneading the mixture by a known method.

The order of mixing each component is not particularly limited. For example, it is preferable that all the components be mixed and stirred for a certain period of time or that the components other than the dispersing agent be mixed and stirred for a certain period of time, followed by the addition of the dispersing agent, according to need, and stirring for a certain period of time. Furthermore, according to need, the viscosity of the paste may be adjusted by controlling the amount of the solvent.

(Electrode and Membrane-Electrode Junction)

The electrode can be formed by applying the electrode paste in the membrane-electrode junction of the present invention on a gas diffusion layer, followed by drying. Alternatively, the electrode of the present invention can be obtained by applying the electrode paste according to the present invention on a transfer base material and removing the solvent. The membrane-electrode junction of the present invention can be obtained by forming such an electrode on at least one side of a polymer electrolyte.

As the transfer base material, a sheet consisting of a fluorine-based polymer such as polytetrafluoroethylene (PTFE), a glass or metal plate having a surface treated with a releasing agent, or a polyethylene terephthalate (PET) sheet can be also used.

Examples of the method of the application include flat-brush coating, round-brush coating, bar coater coating, knife coater coating, a doctor blade method, screen printing, and spray coating.

The electrode applied on the transfer base material is subjected to drying for removing the solvent and then was transferred on at least one side of a solid polymer electrolyte membrane to give a membrane-electrode junction of the present invention.

The solid polymer electrolyte membrane used in the membrane-electrode junction of the present invention is not particularly limited as long as it is a solid polymer membrane having proton conductivity.

Examples of the solid polymer electrolyte membrane include electrolyte membranes of perfluoroalkylsulfonic acid polymers such as Nafion (manufactured by DuPont), Flemion (manufactured by Asahi Glass Co., Ltd.), and Aciplex (manufactured by Asahi Chemical Industry Co., Ltd.);

reinforced electrolyte membranes in which perfluoroalkylsulfonic acid polymers are combined with fiber or porous membranes of polytetrafluoroethylenes;

electrolyte membranes of partially fluorinated sulfonated polymers such as polytetrafluoroethylene-graft sulfonated polystyrene;

electrolyte membranes of aromatic sulfonated polymers such as sulfonated polyarylene, sulfonated polyphenylene, sulfonated polyether ketone, sulfonated polyether sulfone, sulfonated polyether nitrile, sulfonated polyphenylene ether, sulfonated polyphenylene sulfide, sulfonated polybenzimidazole, sulfonated polybenzoxazole, and sulfonated polybenzthiazole;

electrolyte membranes of sulfonated aliphatic polymers such as sulfonated polystyrene and sulfonic acid-containing acrylic polymers;

pore-filling electrolyte membranes in which the above-mentioned electrolyte membranes are combined with porous membranes; and electrolyte membranes of acid-impregnated polymers in which polymers such as polybenzoxazole, polybenzimidazole, and polybenzthiazole are impregnated with acids such as phosphoric acid and sulfuric acid. Among them, preferred are electrolyte membranes of sulfonated aromatic polymers.

In addition, a polymer constituting the above-mentioned electrolyte for the electrode can be used as the solid polymer electrolyte.

The electrode can be transferred onto the solid polymer electrolyte membrane by hot pressing. The hot pressing is a method in which the face of the electrode paste applied on carbon paper or a releasing sheet is press-bonded to an electrolyte membrane. The hot pressing is usually carried out by applying a pressure of 10 to 500 kg/cm$^2$ at a temperature in the range of 50 to 250° C. for 1 to 180 minutes.

In another method of obtaining the membrane-electrode junction of the present invention, application and drying of an electrode layer and an electrolyte membrane application are repeated in stages. The order of the application and the drying is not particularly limited.

For example, a solution for an electrolyte membrane is applied on a base material such as a PET film, followed by drying, for forming an electrolyte membrane, and then the electrode paste of the present invention is applied on the electrolyte membrane. Then, the base material is peeled off, and the electrode paste is applied on the other surface of the electrolyte membrane. Lastly, the solvent is removed to give a membrane-electrode junction (the membrane-electrode junction is sometimes called a catalyst-containing electrolyte membrane). The application method may be the same as that described above.

The removing of the solvent is carried out at a drying temperature of 20 to 180° C., preferably 50 to 160° C., for a drying time of 5 to 600 minutes, preferably 30 to 400 minutes.

According to need, the solvent may be removed by immersing the electrolyte membrane in water. The water temperature is 5 to 120° C., preferably 15 to 95° C., and the time for the immersion in water is from 1 minute to 72 hours, preferably from 5 minutes to 48 hours.

In addition, on the contrary to the above-mentioned method, the catalyst-containing electrolyte membrane may be formed by first forming an electrode layer by the application of the electrode paste, then forming an electrolyte membrane by application of an electrolyte membrane solution, and subsequently forming another electrode layer (also called a catalyst layer) by a similar manner.

The thickness of the electrode layer is not particularly limited, but it is desirable that the amount of the metal immobilized as the catalyst be within the range of 0.05 to 4.0 mg/cm$^2$, preferably 0.1 to 2.0 mg/cm$^2$, per unit area. By controlling the amount to this range, sufficiently high catalyst activity can be obtained, and protons can be efficiently conducted.

It is desirable that the pore volume of the electrode layer be within the range of 0.05 to 3.0 ml/g, preferably 0.1 to 2.0 ml/g. The pore volume of the electrode layer is measured by a method such as mercury porosimetry or gas adsorption.

The thickness of the electrolyte membrane is not particularly limited. However, since a larger thickness causes a reduction in power generation efficiency or makes it difficult to reduce the weight, the thickness is preferably about from 10 to 200 μm, but is not limited thereto.

EXAMPLES

The present invention will be more specifically described on the basis of examples below, but is not limited to the examples. It is noted that various measurement items in the examples were determined as follows. In addition, it is noted that "%" in the examples means "wt %" unless otherwise specified.

The sulfonated polymer films used in various measurements were produced by dissolving a sulfonated polymer in an N-methylpyrrolidone/methanol solution and then conducting a casting method.

[Weight Average Molecular Weight]

The number average molecular weight (Mn) and the weight average molecular weight (Mw) of a copolymer were determined as molecular weights in terms of polystyrene by gel permeation chromatography (GPC) using an NMP buffer solution as the solvent. The NMP buffer solution was prepared at a ratio of NMP (3 L)/phosphoric acid (3.3 mL)/lithium bromide (7.83 g).

[Sulfonic Acid Group Equivalent]

The resulting sulfonated polymer was washed with distilled water until the washing water became neutral for removing the remaining free acid and then was dried. Then, a predetermined amount of the polymer was weighed and was dissolved in a solvent mixture of THF/water. The resulting solution was titrated with a NaOH standard solution using phenolphthalein as an indicator, and the equivalent (ion-exchange capacity) (meq/g) of the sulfonic acid group was determined from the neutralization point.

[Measurement of Rupture Strength and Elastic Modulus]

The measurements of rupture strength and elastic modulus were carried out according to JIS K7113 (tension rate: 50 mm/min). However, the elastic modulus was calculated by using a distance between marked lines as the chuck distance. According to JIS K7113, condition adjustment of specimens was carried out under conditions of a temperature of 23±2° C. and a relative humidity of 50±5% for 48 hours. The specimens were punched with a dumbbell No. 7 described in JIS K6251. As the measurement apparatus for the tension test, model 5543 manufactured by INSTRON was used.

[Measurement of Proton Conductivity]

The AC resistance was determined by pressing platinum needles (f=0.5 mm) to a surface of strip-like specimen membrane having a 5 mm width, holding the specimen in a constant temperature and humidity apparatus, and measuring the AC impedance between the platinum needles. That is, impedance at an AC of 10 kHz under the circumstance of at 85° C. and a relative humidity of 90% was measured. As the apparatus for measuring the resistance, a chemical impedance measurement system manufactured by NF Corporation was used.

As the constant temperature and humidity apparatus, JW241 manufactured by Yamato Scientific Co., Ltd. was used. The AC resistance was measured by pressing five platinum needles at an interval of 5 mm and varying the distance between the needles from 5 to 20 mm. The specific resistance of the membrane was calculated from the needle distances and the resistance gradient, and the proton conductivity was calculated from the reciprocal of the specific resistance.

Specific resistance $R$ (Ω·cm)=0.5 (cm)×membrane thickness (cm)×resistance gradient between needles (Ω/cm)

[Heat Resistance Test]

A film cut into a 2 cm×3 cm piece was laid between Bemcot and put in a glass test tube and was heated in a compact precise constant temperature chamber (AWC-2) under air conditions at 160° C. for 24 hours. The heated film was dissolved in an NMP buffer solvent at a concentration of 0.2 wt % and was measured for molecular weight and area size (A24) by GPC (solvent: NMP buffer) (HCL-8220, manufactured by Tosoh Corp.). The film before the heating was also measured for molecular weight and area size (A0) under the same conditions, and a change in molecular weight and insoluble ratio defined by the following equation were determined.

Insoluble ratio (%)=($A24$–$A0$)/($A0$).

The NMP buffer solution was prepared at a ratio of NMP (3 L)/phosphoric acid (3.3 mL)/lithium bromide (7.83 g).

Synthesis Example 1

<Synthesis of Sulfonic Acid Unit>

In a 2-L three-necked flask equipped with a stirring blade, a thermometer, and a nitrogen inlet tube, 2306.4 g (24 mol) of fluorobenzene was placed and was cooled to 10° C. in an ice bath, followed by gradual addition of 1005.4 g (4.8 mol) of 2,5-dichlorobenzoyl chloride and 832.1 g (6.3 mol) of aluminum chloride, while controlling the reaction temperature not to exceed 40° C. After the addition, the mixture was stirred at 40° C. for 8 hours. After the completion of the reaction, the mixture was dropwise added to ice water, followed by extraction with ethyl acetate. After neutralization with 1% sodium hydrogen carbonate aqueous solution, the extract was washed with saturated saline, followed by concentration. Recrystallization from methanol was carried out to obtain the compound of Formula (30-1) below. The yield was 1033 g.

In a 7-L three-necked flask equipped with a stirrer, a thermometer, a cooling tube, a Dean-Stark tube, and a nitrogen introducing three-way cock, 1323.6q (4.9 mol) of the compound of Formula (30-1) below, 467.9 g (4.9 mol) of 2-hydroxypyridine, and 748.0 g (5.4 mol) of potassium carbonate were placed, and 5 L of N,N-dimethylacetamide (DMAc) and 1 L of toluene were added thereto. The mixture was heated in an oil bath under a nitrogen atmosphere and was subjected to a reaction at 130° C. under stirring. The reaction was carried out, while azeotroping the water generated by the reaction with toluene for removing the water to the outside of the system via the Dean-Stark tube. The generation of water was substantially not recognized after about three hours. Then, most of the toluene was removed, and the reaction was continued for 10 hours at 130° C. The resulting reaction solution was allowed to cool, and the filtrate was put into 20 L of water/methanol (9/1). The precipitated product was collected by filtration and dried. The dried product was placed in a 7-L three-necked flask equipped with a stirrer, a thermometer, a cooling tube, a Dean-Stark tube, and a nitrogen introducing three-way cock and was dissolved in 5 L of toluene under stirring at 100° C. for distilling off the remaining water. After allowed to cool, the crystallized substance was collected by filtration to obtain the objective compound (30-2). The yield was 1300 g.

In a 5-L three-necked flask equipped with a stirrer, a thermometer, a cooling tube, and a nitrogen introducing three-way cock, 585.1 g (1.7 mol) of the compound of Formula (30-2) below was dissolved in 387 g of concentrated sulfuric acid, and the solution was cooled to 20° C. with ice. Then, 1062.5 g of fuming sulfuric acid (60%) was gradually added thereto, followed by stirring at 90° C. for 8 hours. After the completion of the reaction, the mixture was dissolved in ice and neutralized with a sodium hydroxide aqueous solution. Water was removed by concentration, followed by dissolving in dimethyl sulfoxide. Insoluble substances were removed by filtration. The soluble fraction was concentrated and was dissolved in a small amount of dimethyl sulfoxide and coagulated in acetone. The solid was collected by filtration to obtain the objective compound (30-3). The yield was 745 g.

In a 5-L three-necked flask equipped with a stirrer, a thermometer, a cooling tube, and a nitrogen introducing three-way cock, 1054 g (1.9 mol) of the compound of Formula (30-3) below was dissolved in 1 L of sulfolane, and then 920 g of phosphoryl chloride was gradually dropwise added thereto. After the completion of the dropwise addition, the mixture was stirred at 70° C. for 8 hours, and the reaction solution was dropwise added to ice, followed by extraction with ethyl acetate. After neutralization with a sodium hydrogen carbonate aqueous solution, the extract was washed with saturated saline and dried over magnesium sulfate. After concentrating the solvent, coagulation in hexane was performed to obtain the objective compound (30-4). The yield was 373 g.

In a 1-L three-necked flask equipped with a stirring blade, a thermometer, and a nitrogen inlet tube, 324.7 g (0.6 mol) of the compound of Formula (30-4) below and 105.8 g (1.2 mol) of neopentyl alcohol were dissolved in 378 g of pyridine, followed by reaction at from 5 to 10° C. for 8 hours. After the completion of the reaction, the mixture was dropwise added to 1% hydrochloric acid ice water, followed by extraction with ethyl acetate. After neutralization with a 1% sodium hydrogen carbonate aqueous solution, the extract was washed with saturated saline, followed by concentration. Recrystallization from ethyl acetate/methanol was carried out to obtain the compound of Formula (30-5) below. The yield was 193 g.

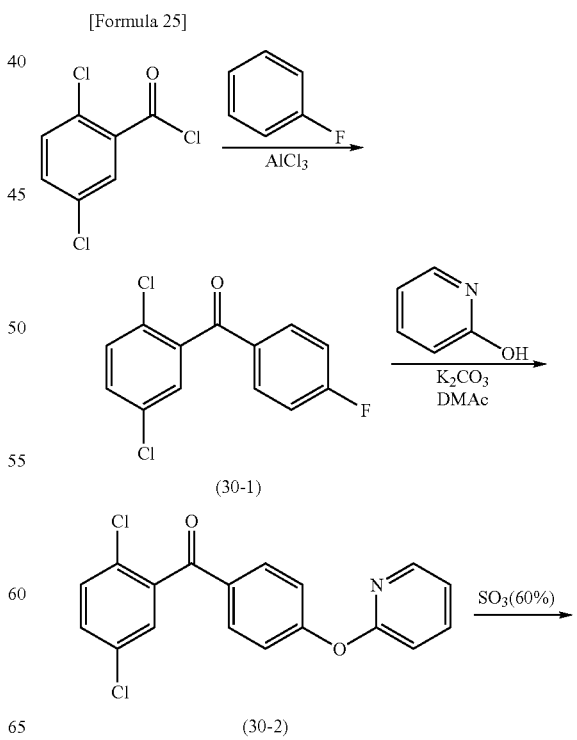

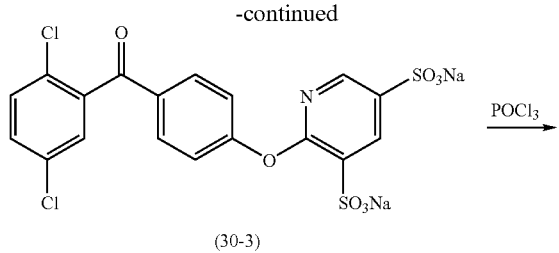

(30-3)

POCl₃ →

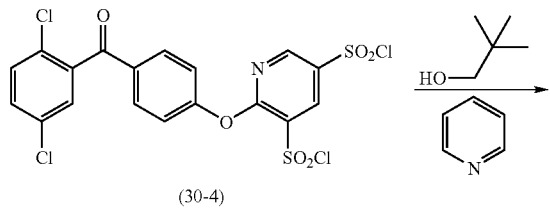

(30-4)

[Formula 26]

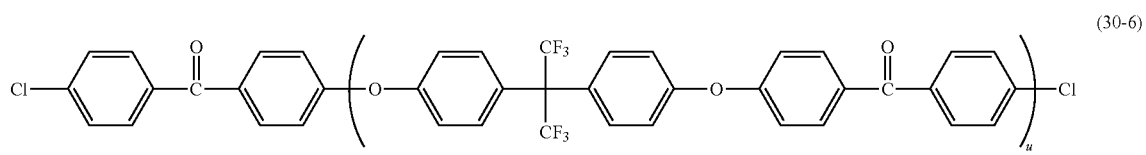

(30-6)

-continued

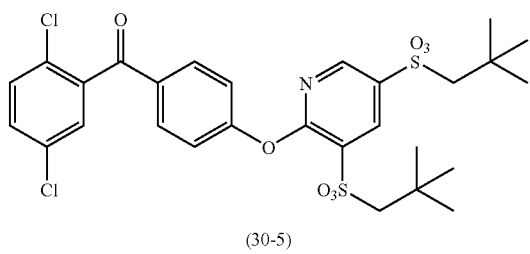

(30-5)

<Synthesis of Hydrophobic Unit>

In a 1-L three-necked flask equipped with a stirrer, a thermometer, a cooling tube, a Dean-Stark tube, and a nitrogen introducing three-way cock, 67.3 g (0.20 mol) of 2,2-bis(4-hydroxyphenyl)-1,1,1,3,3,3-hexafluoropropane, 60.3 g (0.24 mol) of 4,4'-dichlorobenzophenone (4,4'-DCBP), 71.9 g (0.52 mol) of potassium carbonate, 300 mL of N,N-dimethylacetamide (DMAc), and 150 mL of toluene were placed. The mixture was heated in an oil bath under a nitrogen atmosphere and was subjected to a reaction at 130° C. under stirring. The reaction was carried out, while azeotroping the water generated by the reaction with toluene for removing the water to the outside of the system via the Dean-Stark tube. The generation of water was substantially not recognized after about three hours. The reaction temperature was gradually raised from 130° C. to 150° C. Then, most of the toluene was removed, while gradually raising the reaction temperature to 150° C., and the reaction was continued at 150° C. for 10 hours. Then, 10.0 g (0.040 mol) of 4,4'-DCBP was added thereto, and the reaction was further continued for 5 hours. The resulting reaction solution was allowed to cool. Then, the by-product inorganic compound deposit was removed by filtration, and the filtrate was put into 4 L of methanol. The precipitated product was collected by filtration and dried. The dried product was dissolved in 300 mL of tetrahydrofuran. This was reprecipitated from 4 L of methanol to obtain 95 g of the objective compound (yield: 85%).

The Mn in terms of polystyrene of the resulting copolymer measured by GPC (solvent: THF) was 11200. The resulting compound was the oligomer represented by Formula (30-6).

<Synthesis of Polymer>

The dried DMAc (239 mL) was added, under nitrogen, to a mixture of 62.27 g (96.6 mmol) of the compound represented by Formula (30-5) above, 38.08 g (3.4 mmol) of a hydrophobic unit synthesized as Formula (30-6) above, 3.27 g (5.0 mmol) of bis(triphenylphosphine)nickel dichloride, 10.49 g (40 mmol) of triphenylphosphine, 0.45 g (3.0 mmol) of sodium iodide, and 15.69 g (240 mmol) of zinc.

The reaction system was heated (finally, up to 79° C.) under stirring, and the reaction was carried out for 3 hours. During the reaction, an increase in viscosity of the system was observed. The polymerization reaction solution was diluted with 658 mL of DMAc, and the solution was stirred for 30 minutes and then was filtered using Celite as a filter aid.

To the filtrate, 50.34 g (579.6 mmol) of lithium bromide was added. The reaction was carried out at an internal temperature of 110° C. for 7 hours under a nitrogen atmosphere. After the reaction, the mixture was cooled to room temperature and was put into 3.5 L of water for coagulation. The coagulated substance was immersed in acetone, followed by filtration and washing. The washed substance was washed with 1.7 kg of 1 N sulfuric acid under stirring. After filtration, the product was washed with ion-exchange water until the pH of the washing solution became higher than 5. The measurement of molecular weights of the resulting polymer by GPC showed an Mn of 53000 and an Mw of 105000. The ion-exchange capacity was 2.28 meq/g. The resulting polymer was represented by the following Formula (30-7).

[Formula 27]

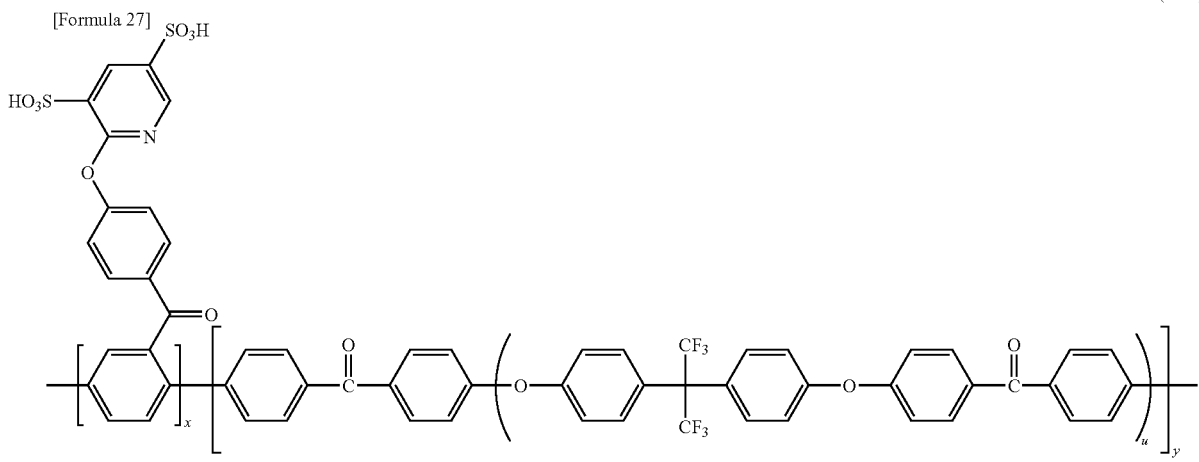

(30-7)

Synthesis Example 2

<Synthesis of Hydrophobic Unit>

In a 1-L three-necked flask equipped with a stirrer, a thermometer, a Dean-Stark tube, a nitrogen inlet tube, and a cooling tube, 154.8 g (0.9 mol) of 2,6-dichlorobenzonitrile, 269.0 g (0.8 mol) of 2,2-bis(4-hydroxyphenyl)-1,1,1,3,3,3-hexafluoropropane, and 143.7 g (1.04 mol) of potassium carbonate were weighed. After nitrogen substitution, 1020 mL of sulfolane and 510 mL of toluene were added thereto, followed by stirring. The reaction solution was heated to reflux at 150° C. in an oil bath. The water generated by the reaction was trapped with the Dean-Stark tube. After 3 hours, when substantially no generation of water was recognized, the toluene was removed to the outside of the system via the Dean-Stark tube. The reaction temperature was gradually raised to 200° C., and the stirring was continued for 3 hours, followed by addition of 51.6 g (0.3 mol) of 2,6-dichlorobenzonitrile. The reaction was further continued for 5 hours.

The reaction solution was allowed to cool and was then diluted with 250 mL of toluene. Inorganic salts insoluble to the reaction solution were removed by filtration, and the filtrate was poured into 8 L of methanol to precipitate the product. The precipitated product was collected by filtration and dried and was then dissolved in 500 mL of tetrahydrofuran. The solution was poured into 5 L of methanol for repre- cipitation. The precipitated white powder was collected by filtration and dried to obtain 258 g of the objective compound. The Mn thereof measured by GPC was 7500.

The resulting compound was confirmed to be an oligomer represented by Formula (30-8).

[Formula 28]

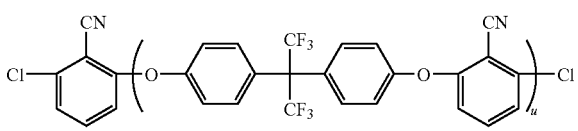

(30-8)

<Synthesis of Polymer>

The same procedure as in Synthesis Example 1 was performed except that 61.24 g (95.0 mmol) of the compound of Formula (30-5) above, 37.50 g (5.0 mmol) of the hydrophobic unit of Formula (30-8) above, and 49.50 g (570 mmol) of lithium bromide were used.

The measurement of molecular weights of the resulting polymer by GPC showed an Mn of 41000 and an Mw of 84000. The ion-exchange capacity was 2.30 meq/g. The resulting polymer was represented by the following Formula (30-9).

[Formula 29]

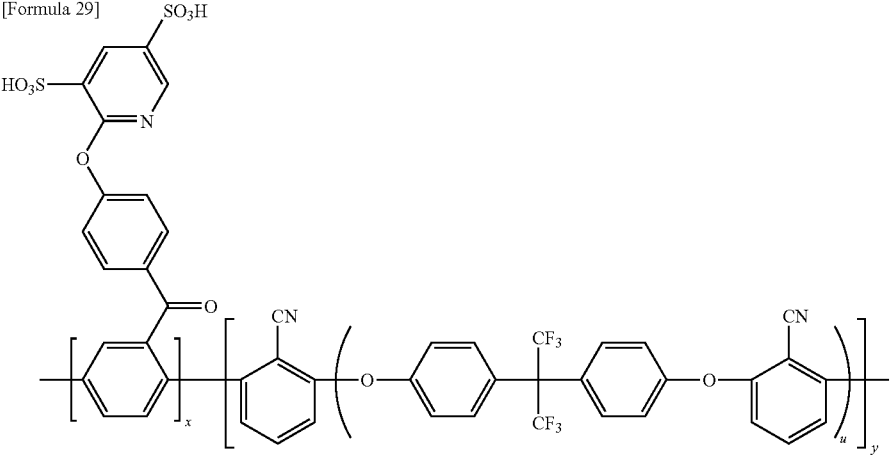

(30-9)

Synthesis Example 3

<Synthesis of Hydrophobic Unit>

In a 1-L separable three-necked flask equipped with a stirring blade, a thermometer, a nitrogen inlet tube, a Dean-Stark tube, and a cooling tube, 52.4 g (240 mmol) of 4,4'-difluorobenzophenone, 14.1 g (60.0 mmol) of 4-chloro-4'-fluorobenzophenone, 70.2 g (203 mmol) of 4,4'-(1,3-phenylenediisopropylidene)bisphenol, 23.7 g (67.5 mmol) of bis(4-hydroxyphenyl)fluorene, and 48.5 g (351 mmol) of potassium carbonate were weighed, followed by addition of 430 mL of DMAc and 220 mL of toluene. The mixture was heated to reflux at 150° C. under a nitrogen atmosphere. The water generated by the reaction was removed by azeotroping with toluene via the Dean-Stark tube. After 3 hours, when substantially no generation of water was recognized, the toluene was removed to the outside of the system. The stirring was continued at 160° C. for 7 hours, followed by addition of 7.0 g (20.0 mmol) of 4-chloro-4'-fluorobenzophenone. The stirring was further continued for 3 hours.

After allowed to cool, inorganic substances insoluble to the reaction solution were removed by filtration using Celite as a filter aid. The filtrate was poured into 2.0 L of methanol to coagulate the reaction product. The precipitated coagulum was collected by filtration, washed with a small amount of methanol, and vacuum-dried. The dried product was redissolved in 200 mL of tetrahydrofuran. The solution was poured into 2.0 L of methanol for reprecipitation. The coagulum was collected by filtration and vacuum-dried to obtain 110 g of the objective compound (yield: 80%). The Mn in terms of polystyrene measured by GPC was 6000. The resulting compound was confirmed to be an oligomer represented by Formula (30-10).

[Formula 30]

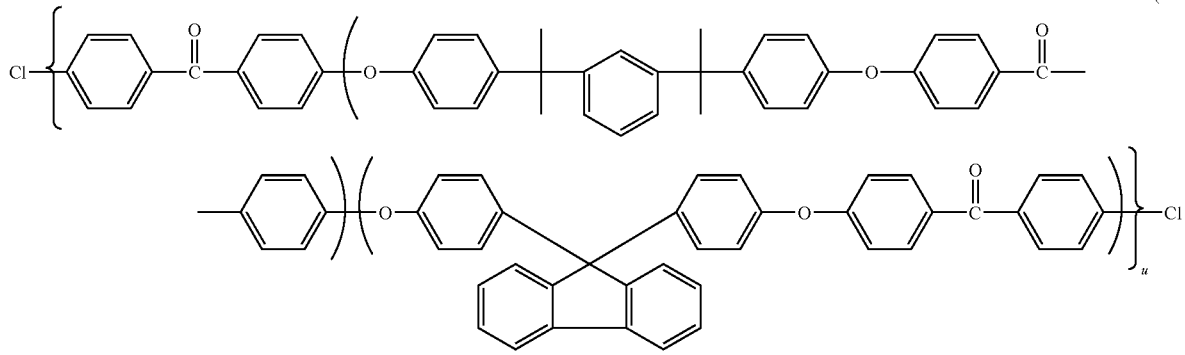

(30-10)

<Synthesis of Polymer>

The same procedure as in Synthesis Example 1 was performed except that 60.46 g (93.8 mmol) of the compound of Formula (30-5) above, 37.20 g (6.2 mmol) of the hydrophobic unit of Formula (30-10) above, and 48.88 g (563 mmol) of lithium bromide were used.

The measurement of molecular weights of the resulting polymer by GPC showed an Mn of 39000 and an Mw of 88000. The ion-exchange capacity was 2.29 meq/g. The resulting polymer was represented by the following Formula (30-11).

[Formula 31]

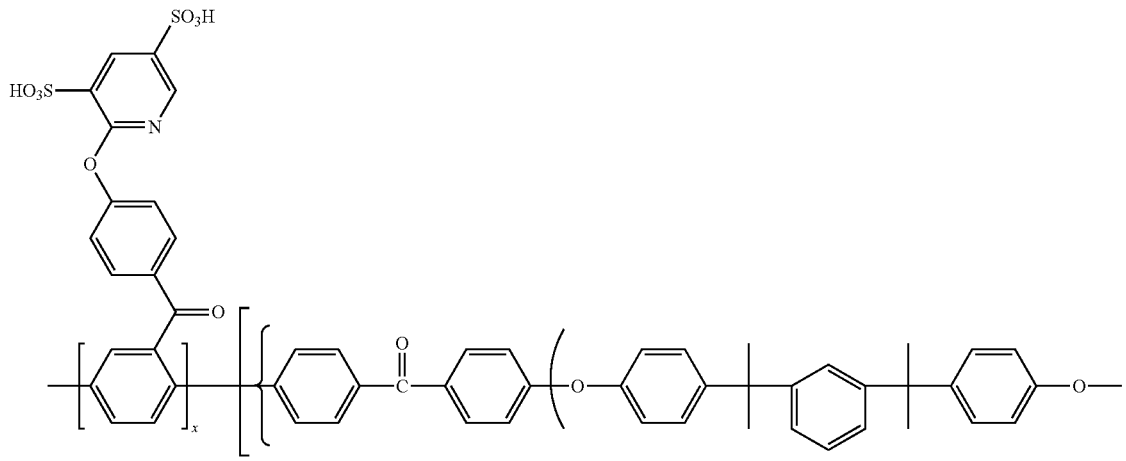

(30-11)

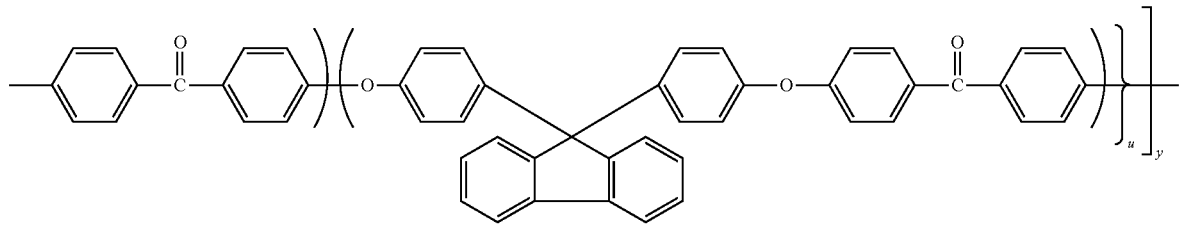

Synthesis Example 4

<Synthesis of Hydrophobic Unit>

In a 3-L separable three-necked flask equipped with a stirring blade, a thermometer, a nitrogen inlet tube, a Dean-Stark tube, and a cooling tube, 207.81 g (952 mmol) of 4,4'-difluorobenzophenone, 42.46 g (181 mmol) of 4-chloro-4'-fluorobenzophenone, 103.8 g (943 mmol) of resorcinol, 36.7 g (105 mmol) of bis(4-hydroxyphenyl)fluorene, and 173.8 g (1.3 mol) of potassium carbonate were weighed, followed by addition of 1250 mL of DMAc and 500 mL of toluene. The mixture was heated to reflux at 150° C. under a nitrogen atmosphere. The water generated by the reaction was removed by azeotroping with toluene via the Dean-Stark tube. After 3 hours, when no generation of water was recognized, the toluene was removed to the outside of the system. The stirring was continued at 160° C. for 7 hours, followed by addition of 12.3 g (52.0 mmol) of 4-chloro-4'-fluorobenzophenone. The stirring was further continued for 3 hours.

After allowed to cool, inorganic substances insoluble to the reaction solution were removed by filtration using Celite as a filter aid. The filtrate was poured into 5.0 L of methanol to coagulate the reaction product. The precipitated coagulum was collected by filtration, washed with a small amount of methanol, and vacuum-dried. The dried product was redissolved in 810 mL of tetrahydrofuran. The solution was poured into 3.2 L of methanol for reprecipitation. The coagulum was collected by filtration and vacuum-dried to obtain 261 g of the objective compound (yield: 75%). The Mn in terms of polystyrene measured by GPC was 4000. The resulting compound was confirmed to be an oligomer represented by Formula (30-12).

[Formula 32]

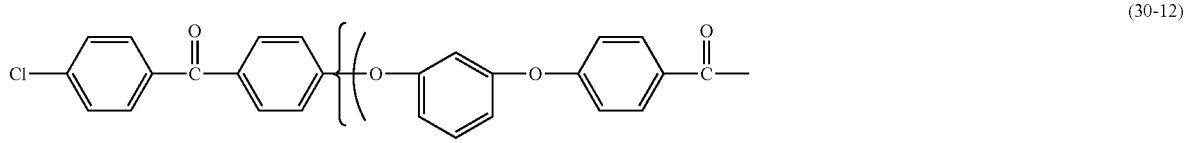

(30-12)

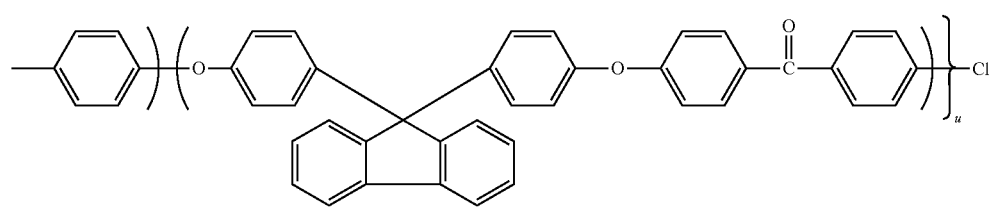

<Synthesis of Polymer>

The same procedure as in Synthesis Example 1 was performed except that 58.59 g (90.9 mmol) of the compound of Formula (30-5) above, 36.40 g (9.1 mmol) of the hydrophobic unit of Formula (30-12) above, and 47.37 g (545 mmol) of lithium bromide were used.

The measurement of molecular weights of the resulting polymer by GPC showed an Mn of 29000 and an Mw of 63000. The ion-exchange capacity was 2.27 meq/g. The resulting polymer was represented by the following Formula (30-13).

[Formula 33]

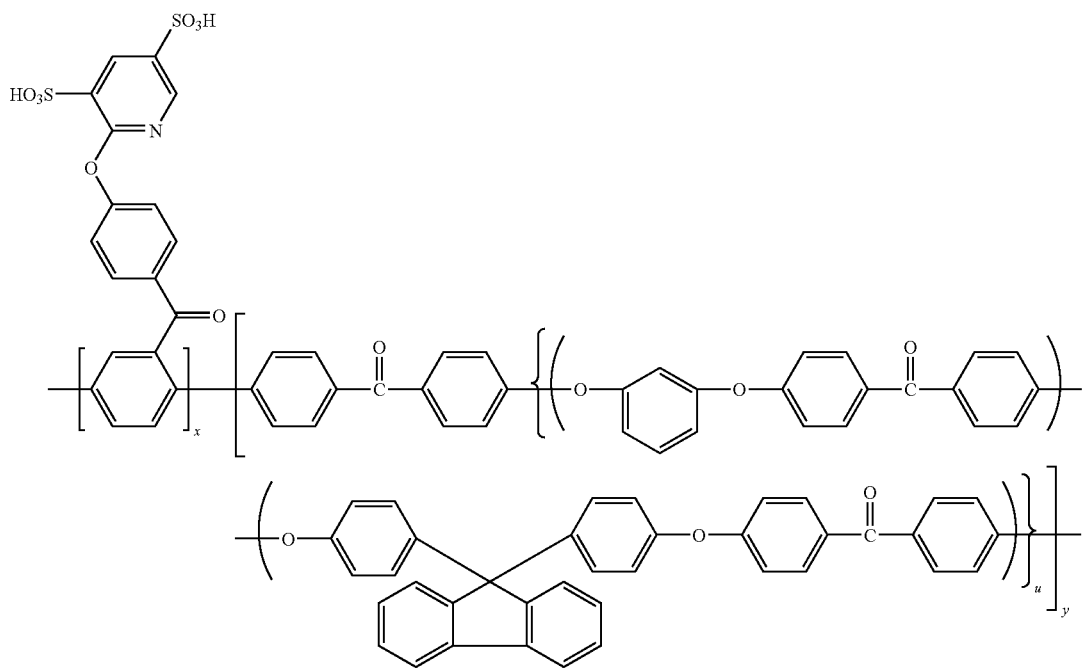

(30-13)

Synthesis Example 5

A monomer was prepared as in Synthesis Example 1 except that imidazole was used instead of 2-hydroxypyridine in Synthesis Example 1. The resulting compound was confirmed to be a monomer represented by Formula (40-1).

[Formula 34]

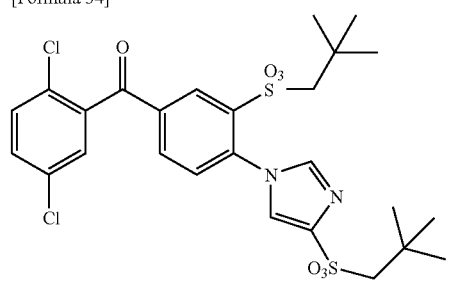

(40-1)

A polymer was synthesized as in Synthesis Example 1 by using 59.53 g (96.4 mmol) of the compound of Formula (40-1) above, 40.32 g (3.6 mmol) of the hydrophobic unit of Formula (30-6) above, and 50.23 g (578 mmol) of lithium bromide.

The measurement of molecular weights of the resulting polymer by GPC confirmed to be an Mn of 32000 and an Mw of 54000. The ion-exchange capacity was 2.26 meq/g. The resulting polymer was represented by the following Formula (40-2).

[Formula 35]

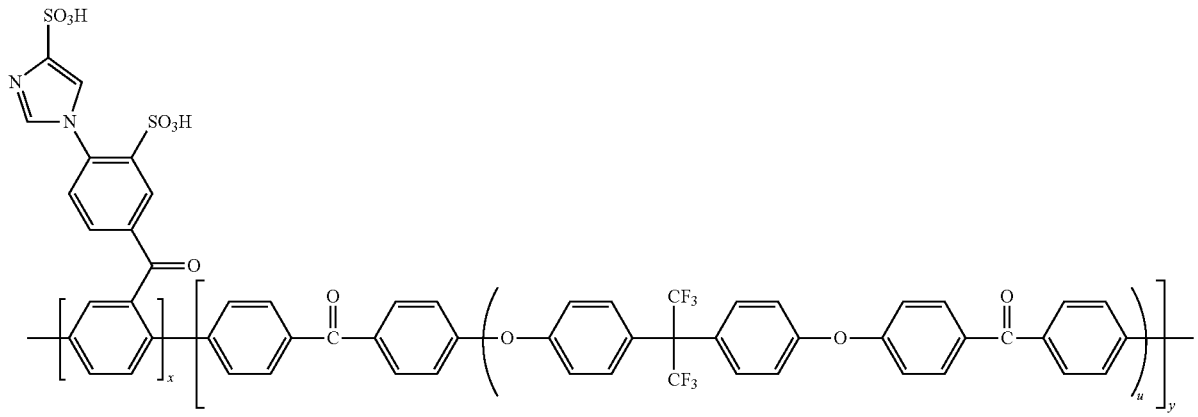

(40-2)

Synthesis Example 6

The same procedure as in Synthesis Example 1 was performed except that 58.48 g (94.7 mmol) of the compound of Formula (40-1) above, 39.75 g (5.3 mmol) of the hydrophobic unit of Formula (30-8) above, and 49.35 g (568 mmol) of lithium bromide were used.

The measurement of molecular weights of the resulting polymer by GPC showed an Mn of 40000 and an Mw of 73000. The ion-exchange capacity was 2.27 meq/g. The resulting polymer was represented by the following Formula (40-3).

Synthesis Example 7

The same procedure as in Synthesis Example 1 was performed except that 57.68 g (93.4 mmol) of the compound of Formula (40-1) above, 39.62 g (6.6 mmol) of the hydrophobic unit of Formula (30-10) above, and 48.67 g (560 mmol) of lithium bromide were used.

The measurement of molecular weights of the resulting polymer by GPC showed an Mn of 45000 and an Mw of 93000. The ion-exchange capacity was 2.27 meq/g. The resulting polymer was represented by the following Formula (40-4).

[Formula 36]

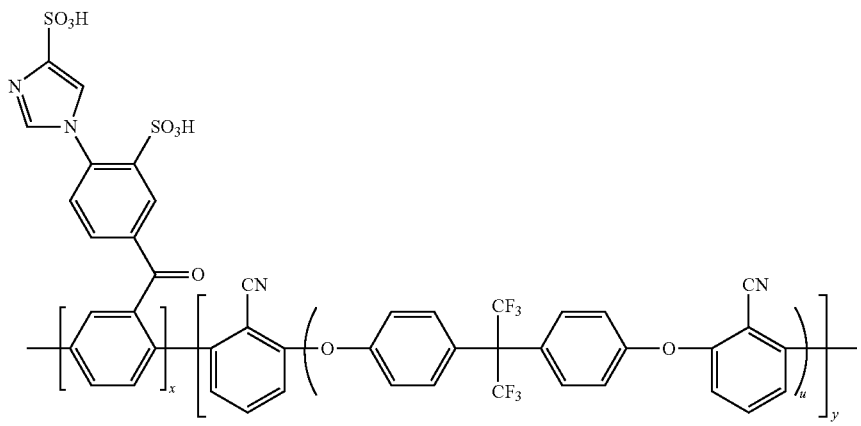

(40-3)

[Formula 37]

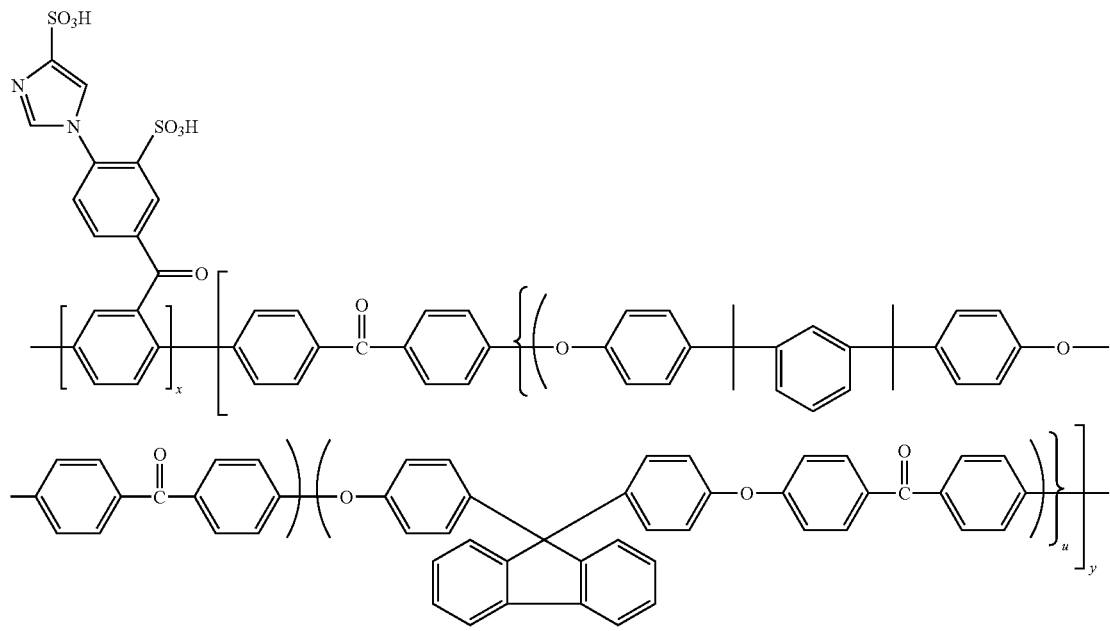

(40-4)

Synthesis Example 8

The same procedure as in Synthesis Example 1 was performed except that 55.83 g (90.4 mmol) of the compound of Formula (40-1) above, 38.40 g (9.6 mmol) of the hydrophobic unit of Formula (30-12) above, and 47.11 g (542 mmol) of lithium bromide were used.

The measurement of molecular weights of the resulting polymer by GPC showed an Mn of 32000 and an Mw of 60000. The ion-exchange capacity was 2.27 meq/g. The resulting polymer was represented by the following Formula (40-5).

[Formula 38]

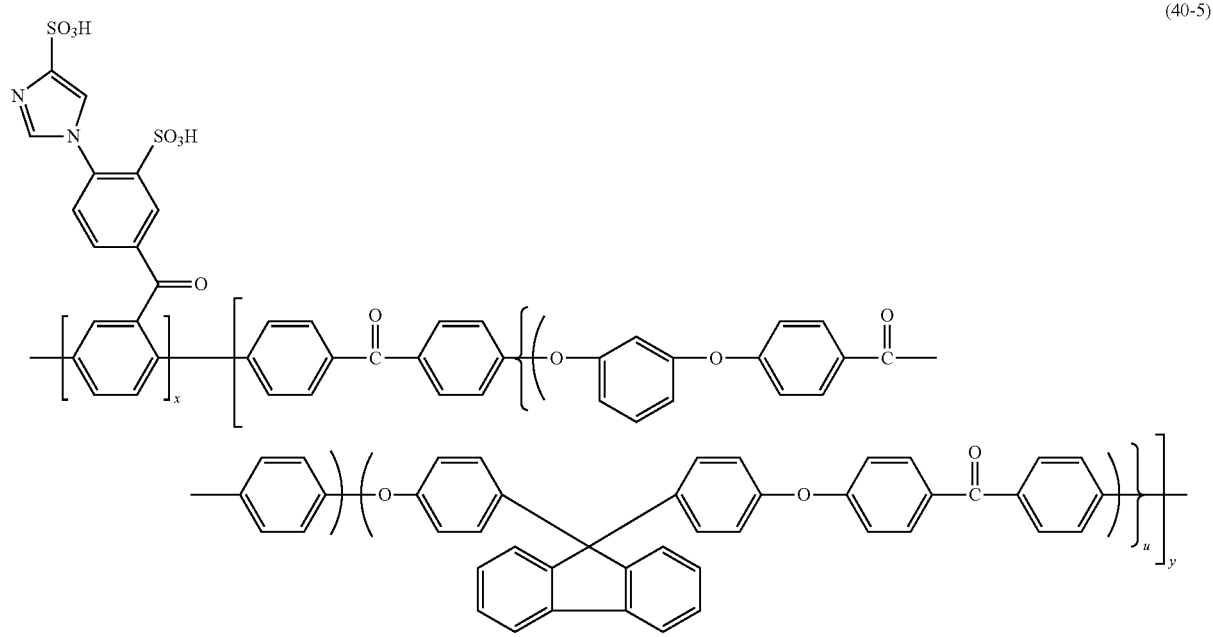

(40-5)

Synthesis Example 9

The compound of the following Formula (50-1) was prepared by a reaction of dichlorobenzene and nicotinoyl chloride in the presence of aluminum chloride. Sulfonation by fuming sulfuric acid, chlorosulfonation by phosphoryl chloride, and esterification by neopentyl alcohol were carried out as in Synthesis Example 1 to obtain the compound of the following Formula (50-2).

[Formula 39]

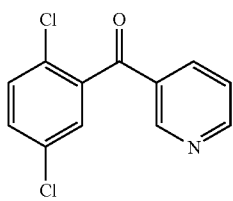

(50-1)

[Formula 40]

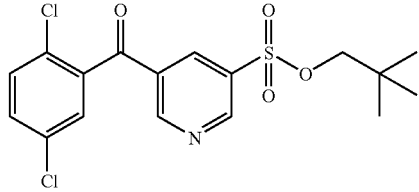

(50-2)

The polymer synthesis was carried out as in Synthesis Example 1 except that 39.69 g (98.7 mmol) of the compound of Formula (50-2) above, 15.12 g (1.4 mmol) of the hydrophobic unit of Formula (30-6) above, and 25.70 g (296 mmol) of lithium bromide were used.

The measurement of molecular weights of the resulting polymer by GPC showed an Mn of 34000 and an Mw of 67000. The ion-exchange capacity was 2.26 meq/g. The resulting polymer was represented by the following Formula (50-3).

[Formula 41]

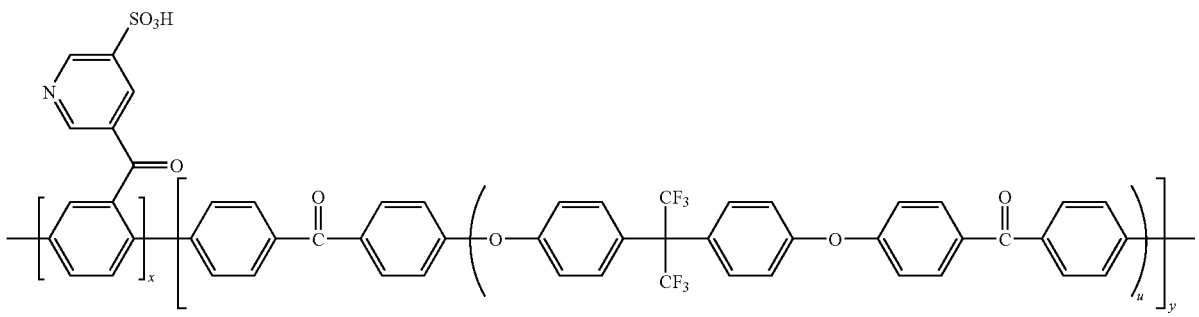

(50-3)

Synthesis Example 10

The polymer synthesis was carried out as in Synthesis Example 1 except that 39.42 g (98.0 mmol) of the compound of Formula (50-2) above, 15.0 g (2.0 mmol) of the hydrophobic unit of Formula (30-8) above, and 25.53 g (294 mmol) of lithium bromide were used.

The measurement of molecular weights of the resulting polymer by GPC showed an Mn of 33000 and an Mw of 70000. The ion-exchange capacity was 2.25 meq/g. The resulting polymer was represented by the following Formula (50-4).

[Formula 42]

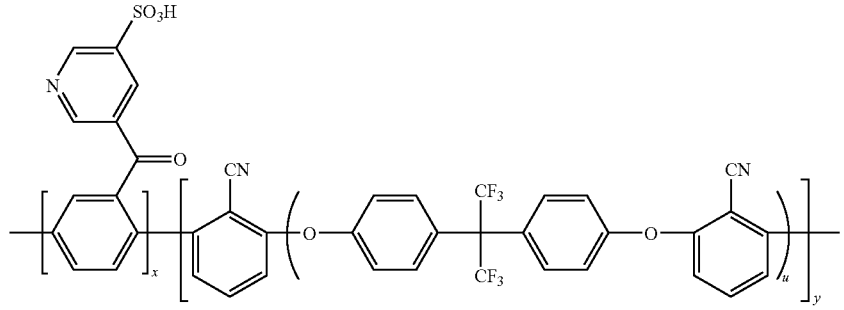

(50-4)

Synthesis Example 11

The polymer synthesis was carried out as in Synthesis Example 1 except that 39.22 g (97.5 mmol) of the compound of Formula (50-2) above, 15.00 g (2.5 mmol) of the hydrophobic unit of Formula (30-10) above, and 25.40 g (293 mmol) of lithium bromide were used.

The measurement of molecular weights of the resulting polymer by GPC showed an Mn of 42000 and an Mw of 81000. The ion-exchange capacity was 2.29 meq/g. The resulting polymer was represented by the following Formula (50-5).

Synthesis Example 12

The polymer synthesis was carried out as in Synthesis Example 1 except that 38.74 g (96.3 mmol) of the compound of Formula (50-2) above, 14.80 g (3.7 mmol) of the hydrophobic unit of Formula (30-12) above, and 25.09 g (289 mmol) of lithium bromide were used.

The measurement of molecular weights of the resulting polymer by GPC showed an Mn of 32000 and an Mw of

[Formula 43]

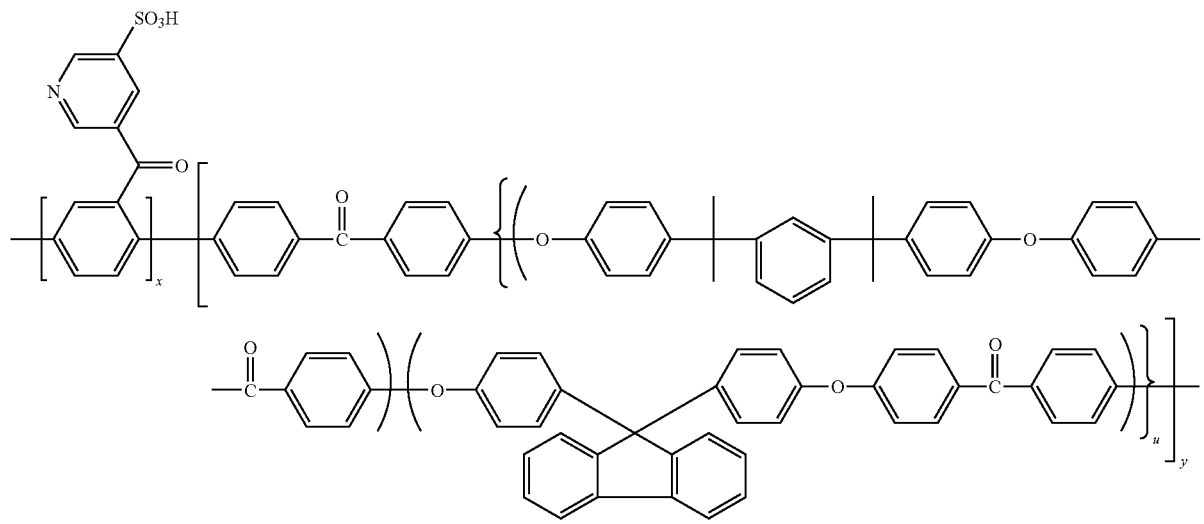

(50-5)

66000. The ion-exchange capacity was 2.26 meq/g. The resulting polymer was represented by the following Formula (50-6).

[Formula 44]

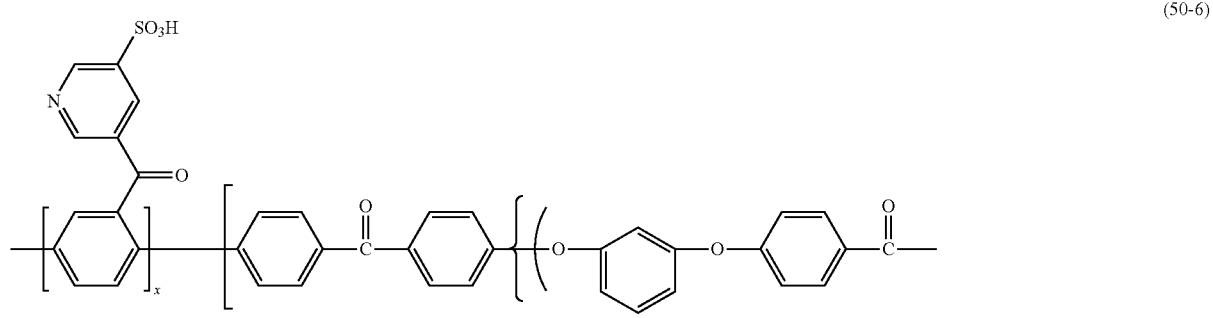

(50-6)

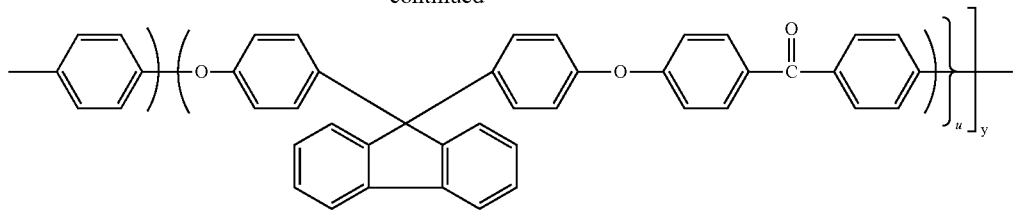

Comparative Synthesis Example 1

An experimental procedure was carried out by the same method as in Synthesis Example 1 except that 304 mL of dried DMAc was subjected to a reaction under conditions of 62.1 g (96.5 mmol) of the compound represented by Formula (60-1) below, 39.20 g (3.5 mmol) of the hydrophobic unit synthesized as Formula (30-6) above, 3.27 g (5.0 mmol) of bis(triphenylphosphine)nickel dichloride, 10.49 g (40 mmol) of triphenylphosphine, 0.45 g (3.0 mmol) of sodium iodide, and 15.69 g (240 mmol) of zinc.

[Formula 45]

(60-1)

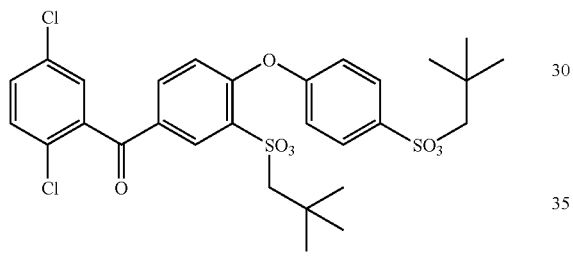

The measurement of molecular weights of the resulting polymer by GPC showed an Mn of 57000 and an Mw of 165000. The ion-exchange capacity was 2.26 meq/g. The resulting polymer was represented by the following Formula (60-2).

[Formula 46]

(60-2)

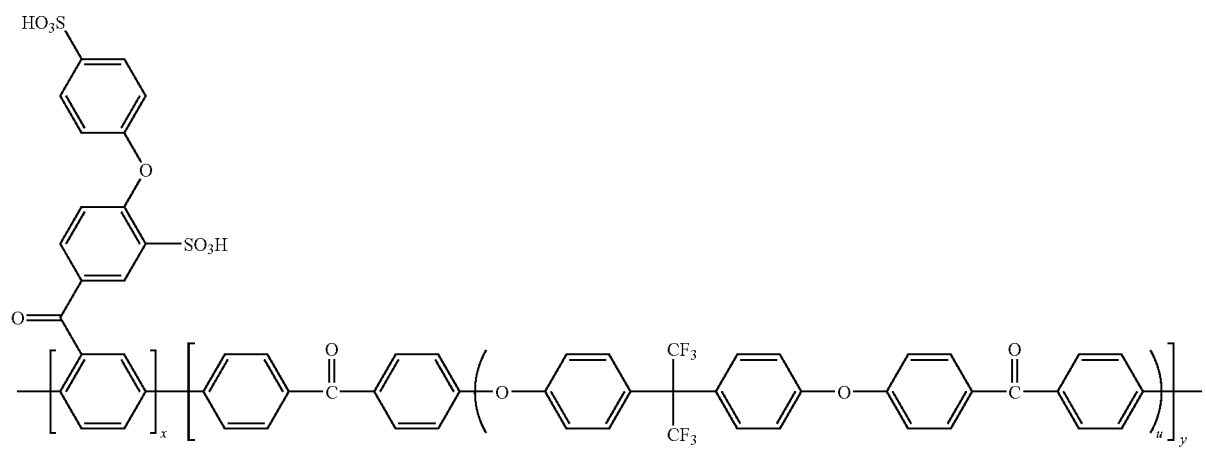

Table 1 shows the characteristics of the sulfonated polymers prepared in Synthesis Examples 1 to 12 and Comparative Synthesis Example 1.

supplying air to one, being used as the oxygen electrode, of the separators and supplying pure hydrogen to the other separator being used as the fuel electrode. The initial power generation characteristics were evaluated under the power generation conditions of a cell temperature of 95° C., an air electrode side relative humidity of 75%, an air electrode side flow rate of 4 L/min, a fuel electrode side relative humidity of 40%, and a fuel electrode side flow rate of 1 L/min. Output voltages at a current density of 1.0 A/cm$^2$ are shown in Table 2. After the evaluation of the initial characteristics, power generation was continued for 500 hours at a cell temperature of 95° C., an air electrode side relative humidity of 75%, an air electrode side flow rate of 0.6 L/min, a fuel electrode side relative humidity of 40%, and a fuel electrode side flow rate of 0.2 L/min, while maintaining the current density at 0.1 A/cm$^2$. After 500 hours, the output voltage at a current density of 1.0 A/cm$^2$ was measured under the same conditions as those in the initial power generation characteristics evaluation. The measurement results are shown in Table 2.

TABLE 1

| | Polymer properties | | | Mechanical properties | | | Heat resistance test | | |
|---|---|---|---|---|---|---|---|---|---|
| | | | Sulfonic acid equivalent | Rupture strength | Elongation | Elasticity | Proton conductivity | Change in molecular weight | Insoluble fraction |
| | Mn | Mw | meq/g | MPa | % | GPa | S/cm | — | % |
| Synthesis Example 1 | 53000 | 105000 | 2.28 | 105 | 41 | 3.1 | 0.26 | No change | 0 |
| Synthesis Example 2 | 41000 | 84000 | 2.30 | 99 | 40 | 3.2 | 0.31 | No change | 0 |
| Synthesis Example 3 | 39000 | 88000 | 2.29 | 101 | 38 | 3.9 | 0.30 | No change | 0 |
| Synthesis Example 4 | 29000 | 63000 | 2.27 | 108 | 42 | 3.4 | 0.29 | No change | 0 |
| Synthesis Example 5 | 32000 | 54000 | 2.26 | 95 | 35 | 3.5 | 0.28 | No change | 0 |
| Synthesis Example 6 | 40000 | 73000 | 2.27 | 99 | 37 | 3.6 | 0.29 | No change | 0 |
| Synthesis Example 7 | 45000 | 93000 | 2.28 | 103 | 41 | 3.3 | 0.32 | No change | 0 |
| Synthesis Example 8 | 32000 | 60000 | 2.27 | 112 | 37 | 3.1 | 0.31 | No change | 0 |
| Synthesis Example 9 | 34000 | 67000 | 2.26 | 110 | 40 | 3.0 | 0.29 | No change | 0 |
| Synthesis Example 10 | 33000 | 70000 | 2.25 | 106 | 60 | 3.4 | 0.30 | No change | 0 |
| Synthesis Example 11 | 42000 | 81000 | 2.29 | 102 | 72 | 3.1 | 0.32 | No change | 0 |
| Synthesis Example 12 | 32000 | 66000 | 2.26 | 111 | 45 | 3.1 | 0.33 | No change | 0 |
| Comparative Synthesis Example 1 | 57000 | 165000 | 2.26 | 110 | 40 | 2.8 | 0.30 | Significant change | 80 |

Examples 1 to 12

[Preparation of Pastes 1 to 12]

Twenty-five grams of zirconia balls having a diameter of 10 mm (trade name: YTZ ball, manufactured by Nikkato Co., Ltd.) were put in a 50-mL glass bottle, and 1.51 g of carbon particles supporting platinum (supported Pt: 46 wt, (TEC10E50E): manufactured by Tanaka Kikinzoku Kogyo), 0.88 g f distilled water, 3.23 g of a 15% water/1,2-dimethoxyethane solution (10:90 in weight ratio) of a sulfonated polymer synthesized in any of Synthesis Examples 1 to 12, and 13.97 g of 1,2-dimethoxyethane were put in the bottle. The mixture was stirred with a wave roter for 60 minutes to give a paste with a viscosity of 50 cp (25° C.). Synthetic Examples 1 to 12 give the pastes of Examples 1 to 12, respectively.

[Production of Gas Diffusion Layer]

Carbon black and polytetrafluoroethylene (PTFE) particles were mixed at a weight ratio of carbon black:PTFE particles=4:6. The resulting mixture was uniformly dispersed in ethylene glycol to give slurry. The slurry was applied to one side of carbon paper and dried to form a base layer. Thus, two diffusion layers 3 each composed of the base layer and the carbon paper were produced.

[Production of Gas Diffusion Electrode]

On each of the thus-produced diffusion layer, paste 1 was applied by doctor blade such that the amount of platinum applied was 0.5 mg/cm$^2$. This was dried by heating at 95° C. for 10 minutes to form a gas diffusion electrode layer.

[Production of Membrane-Electrode Junction]

One electrolyte membrane of the electrolyte membrane (thickness: 30 μm) made of the sulfonated polymer of Synthesis Example 2 was prepared and was disposed between the pair of gas diffusion electrode layers produced above, followed by hot-pressing under a pressure of 100 kg/cm$^2$, at 160° C., for 15 minutes to form a membrane-electrode junction.

[Power Generation Evaluation]

A solid polymer-type fuel cell was constituted by laminating separators simultaneously serving as gas passages on both sides of the membrane-electrode junction obtained above. By using this as a single cell, electric power was generated by Comparative Example 1

An electrode paste, gas diffusion layers, gas diffusion electrodes, and a membrane-electrode junction were produced by the same processes as those in Example 1 except that a Nafion solution (20.1 wt % solution of 2020CS manufactured by DuPont) was used instead of the polymer used for forming the electrode paste in Example 1, and power generation was evaluated under the same conditions as those in Example 1.

TABLE 2

| | Type of electrode | Type of membrane | Cell voltage (V@1.0 A/cm$^2$) | | |
|---|---|---|---|---|---|
| Example | sulfonated polymer | sulfonated polymer | Initial | After 500 hrs | Retentivity % |
| Example 1 | Synthesis Example 1 | Synthesis Example 2 | 0.54 | 0.52 | 95 |
| Example 2 | Synthesis Example 2 | Synthesis Example 2 | 0.52 | 0.48 | 93 |
| Example 3 | Synthesis Example 3 | Synthesis Example 2 | 0.52 | 0.49 | 95 |
| Example 4 | Synthesis Example 4 | Synthesis Example 2 | 0.50 | 0.48 | 97 |

TABLE 2-continued

| Example | Type of electrode sulfonated polymer | Type of membrane sulfonated polymer | Cell voltage (V@1.0 A/cm²) Initial | After 500 hrs | Retentivity % |
|---|---|---|---|---|---|
| Example 5 | Synthesis Example 5 | Synthesis Example 2 | 0.53 | 0.49 | 93 |
| Example 6 | Synthesis Example 6 | Synthesis Example 2 | 0.52 | 0.49 | 95 |
| Example 7 | Synthesis Example 7 | Synthesis Example 2 | 0.54 | 0.52 | 95 |
| Example 8 | Synthesis Example 8 | Synthesis Example 2 | 0.52 | 0.48 | 93 |
| Example 9 | Synthesis Example 9 | Synthesis Example 2 | 0.50 | 0.47 | 95 |
| Example 10 | Synthesis Example 10 | Synthesis Example 2 | 0.49 | 0.45 | 93 |
| Example 11 | Synthesis Example 11 | Synthesis Example 2 | 0.49 | 0.46 | 95 |
| Example 12 | Synthesis Example 12 | Synthesis Example 2 | 0.51 | 0.48 | 95 |
| Comparative Example 1 | Nafion | Synthesis Example 2 | 0.54 | 0.40 | 75 |

* Retentivity = (cell voltage after 500 h/cell voltage at 0 h)

As shown in Table 2, it was confirmed that excellent cell voltage retentivity can be obtained, compared to the case of Nafion.

The invention claimed is:

1. An electrode paste, comprising an electrode electrolyte for a polymer-type fuel cell, catalyst particles, and a solvent,

[Formula (I)]

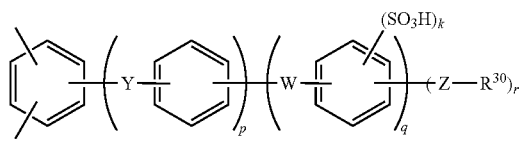

(in Formula (I), Y denotes at least one kind of structure selected from the group consisting of —CO—, —SO$_2$—, —SO—, —CONH—, —COO—, —(CF$_2$)$_l$— (l is an integer of 1 to 10), and —C(CF$_3$)$_2$—; W denotes at least one kind of structure selected from the group consisting of a direct bond, —CO—, —SO$_2$—, —SO—, —CONH—, —COO—, —(CF$_2$)$_l$— (l is an integer of 1 to 10), —C(CF$_3$)$_2$—, —O—, and —S—; Z denotes a direct bond or at least one kind of structure selected from the group consisting of —(CH$_2$)$_l$— (l is an integer of 1 to 10), —C(CH$_3$)$_2$—, —O—, —S—, —CO—, and —SO$_2$—; R$^{30}$ denotes at least one type of group derived from a compound selected from the group consisting of pyrrole, thiazole, isothiazole, oxazole, isoxazole, imidazole, imidazoline, imidazolidine, pyrazole, 1,3,5-triazine, pyridine, pyrimidine, pyridazine, pyrazine, indole, quinoline, isoquinoline, burine, tetrazole, tetrazine, triazole, carbazole, acridine, quinoxaline, quinazoline, indolizine, isoindole, 3H-indole, 2H-pyrrole, 1H-indazole, purine, phthalazine, naphthyridine, cinnoline, pteridine, carboline, phenanthridine, perimidine, phenanthroline, phenazine, phenarsazine, phenothiazine, furazan, phenoxazine, pyrrolidine, pyrroline, pyrazoline, pyrazolidine, piperidine, piperazine, indoline, isoindoline, and quinuclidine, and derivatives thereof, having at least one substituent represented by —SO$_3$H, —O(CH$_2$)$_h$SO$_3$H, or —O(CF$_2$)$_h$SO$_3$H (h is an integer of 1 to 12); and p denotes an integer of 0 to 10; q denotes an integer of 0 to 10; r denotes an integer of 1 to 5; and k denotes an integer of 0 to 4, and in single lines at the ends of each constitutional unit, a single line not showing a substituent on one side thereof means coupling with the adjacent constitutional unit).

2. The electrode paste of according to claim 1, wherein the copolymer further includes a repeating constitutional unit represented by the following Formula (II):

[Formula (II)]

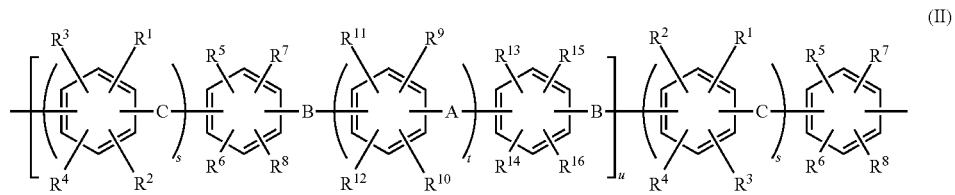

(in Formula (II), each A and C independently denotes a direct bond or at least one kind of structure selected from the group consisting of —CO—, —SO$_2$—, —SO—, —CONH—, —COO—, —(CF$_2$)$_l$— (l is an integer of 1 to 10), —C(CF$_3$)$_2$—, —(CH$_2$)$_l$— (l is an integer of 1 to 10), —C(CR'$_2$)$_2$— (R' is a hydrocarbon group or a cyclic hydrocarbon group), —O—, and —S—; each B independently denotes an oxygen atom or a sulfur atom; R$^1$ to R$^{16}$ may be the same or different from one another and each denote at least one kind of atom or group selected from the group consisting of hydrogen atoms, fluorine atoms, alkyl groups, halogenated alkyl groups that are partially or fully halogenated, allyl groups, aryl groups, nitro groups, and nitrile groups; s and t each denote an integer of 0 to 4; and u denotes 0 or an integer of 1 or more, and in single lines at the ends of each constitutional unit, a single line not showing a substituent on one side thereof means coupling with the adjacent constitutional unit).

* * * * * wherein the electrode electrolyte comprises a polyarylene-based copolymer including a sulfonic acid group, wherein the copolymer contains a repeating constitutional unit represented by the following Formula (I):